(12) United States Patent
Miyazaki

(10) Patent No.: US 9,443,342 B2
(45) Date of Patent: Sep. 13, 2016

(54) INFORMATION PROCESSING APPARATUS, DATA DIVISION METHOD, AND DATA DIVISION PROGRAM

(71) Applicant: SONY CORPORATION, Tokyo (JP)

(72) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/837,293

(22) Filed: Aug. 27, 2015

(65) Prior Publication Data

US 2015/0363961 A1 Dec. 17, 2015

Related U.S. Application Data

(63) Continuation of application No. 13/198,524, filed on Aug. 4, 2011, now Pat. No. 9,153,286.

(30) Foreign Application Priority Data

Sep. 6, 2010 (JP) ................. 2010-199350

(51) Int. Cl.
| | |
|---|---|
| *G06T 13/80* | (2011.01) |
| *G06F 3/0488* | (2013.01) |
| *G11B 27/034* | (2006.01) |
| *G11B 27/34* | (2006.01) |
| *G06F 3/041* | (2006.01) |
| *G06F 3/0484* | (2013.01) |

(52) U.S. Cl.
CPC ............ *G06T 13/80* (2013.01); *G06F 3/0416* (2013.01); *G06F 3/04845* (2013.01); *G06F 3/04883* (2013.01); *G11B 27/034* (2013.01); *G11B 27/34* (2013.01); *G06F 2203/04808* (2013.01)

(58) Field of Classification Search
CPC ............... G06F 3/017; G06F 3/04842; G06F 3/04845; G06F 3/0488; G06F 3/04883; G06F 2203/04808; G06F 3/0416; G11B 27/034; G11B 27/34; G06T 13/80
USPC .......................................... 345/173; 715/251
See application file for complete search history.

(56) References Cited

U.S. PATENT DOCUMENTS

| | | |
|---|---|---|
| 5,442,744 A | 8/1995 | Piech et al. |
| 7,702,014 B1 | 4/2010 | Kellock et al. |

(Continued)

FOREIGN PATENT DOCUMENTS

| | | |
|---|---|---|
| EP | 1377047 | 6/2003 |
| EP | 1638102 | 9/2005 |

(Continued)

OTHER PUBLICATIONS

European Search Report issued Oct. 28, 2011 in Munich for corresponding European patent application No. EP11175438.

(Continued)

*Primary Examiner* — Dmitriy Bolotin
(74) *Attorney, Agent, or Firm* — Paratus Law Group, PLLC

(57) ABSTRACT

An information processing apparatus includes an operation unit, and a control unit that displays, on a display unit, a data image representing the contents of temporally continuous data along a time axis. Here, when a gesture operation for cutting the data image perpendicularly to the time axis is performed through the operation unit, the control unit divides the data at a position on the time axis in accordance with the position cut by the gesture operation.

19 Claims, 16 Drawing Sheets

(56) References Cited

U.S. PATENT DOCUMENTS

| | | |
|---|---|---|
| 8,418,082 B2 | 4/2013 | Meaney et al. |
| 8,527,879 B2 | 9/2013 | Symons et al. |
| 2010/0260468 A1 | 10/2010 | Khatib et al. |
| 2010/0281377 A1* | 11/2010 | Meaney ............... G22B 27/034 715/723 |
| 2010/0281379 A1* | 11/2010 | Meaney ............... G11B 27/031 715/723 |
| 2011/0029934 A1 | 2/2011 | Locker et al. |
| 2011/0181524 A1 | 7/2011 | Hinckley et al. |
| 2011/0185299 A1 | 7/2011 | Hinckley et al. |
| 2011/0185300 A1 | 7/2011 | Hinckley et al. |
| 2011/0185318 A1 | 7/2011 | Hinckley et al. |
| 2011/0185320 A1 | 7/2011 | Hinckley et al. |
| 2011/0191704 A1 | 8/2011 | Hinckley et al. |
| 2011/0191718 A1 | 8/2011 | Hinckley et al. |
| 2011/0191719 A1 | 8/2011 | Hinckley et al. |
| 2011/0258547 A1 | 10/2011 | Symons et al. |

FOREIGN PATENT DOCUMENTS

| | | |
|---|---|---|
| EP | 1942401 | 10/2007 |
| JP | 06-043839 | 2/1994 |
| JP | 2005-301693 | 10/2005 |
| JP | 2008-182765 | 8/2008 |
| WO | WO01/45391 | 6/2001 |
| WO | WO2008/079587 | 7/2008 |
| WO | WO2010/071996 A1 | 7/2010 |

OTHER PUBLICATIONS

James Chisan, et al., Video Bench Final Report (XP-002662427), University of Victoria, Apr. 11, 2003, p. 1-48.

* cited by examiner

FIG. 7A
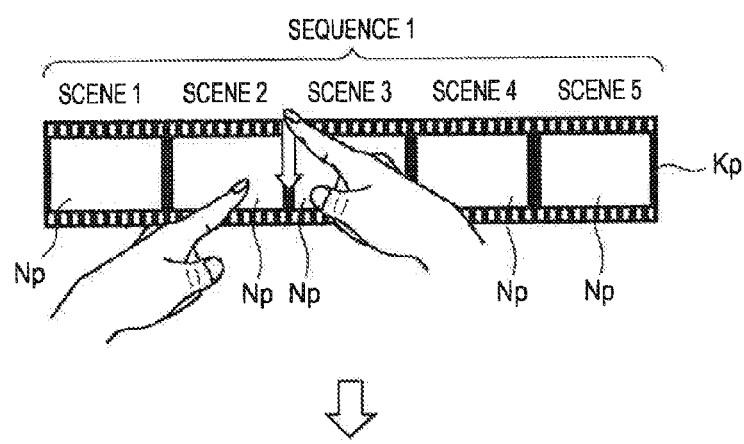
FIG. 7B
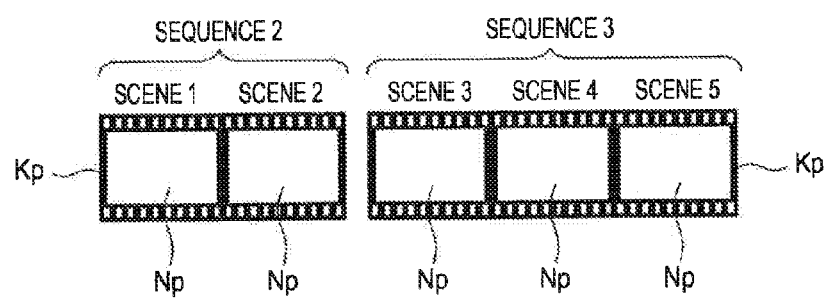

FIG. 10A
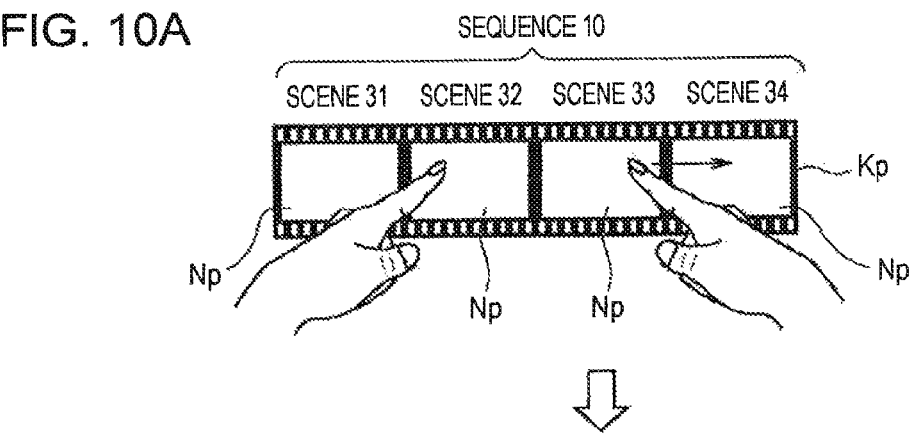
FIG. 10B
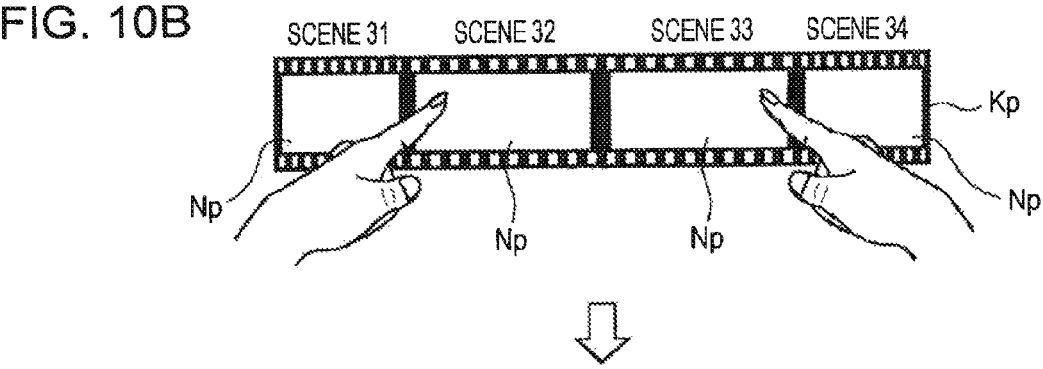
FIG. 10C
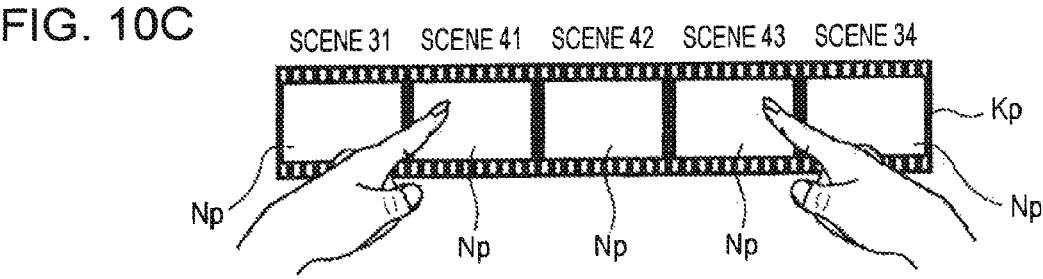

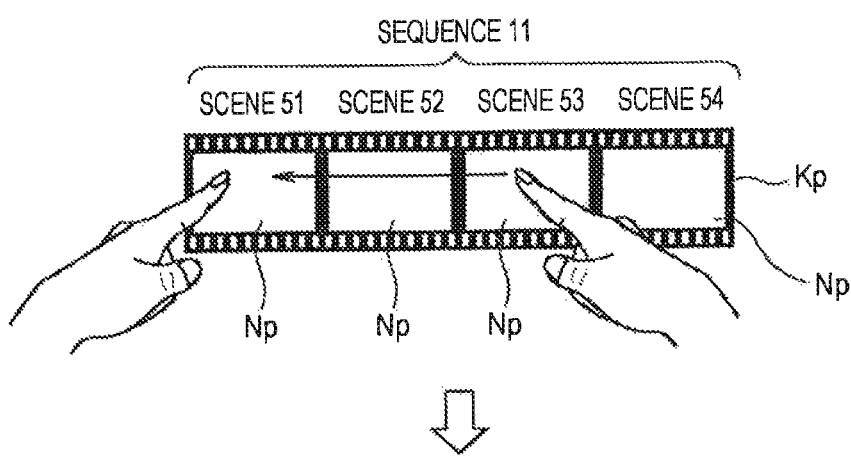
FIG. 11A
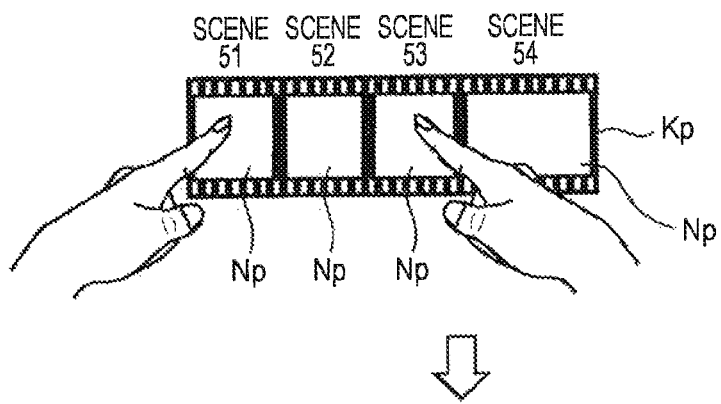
FIG. 11B
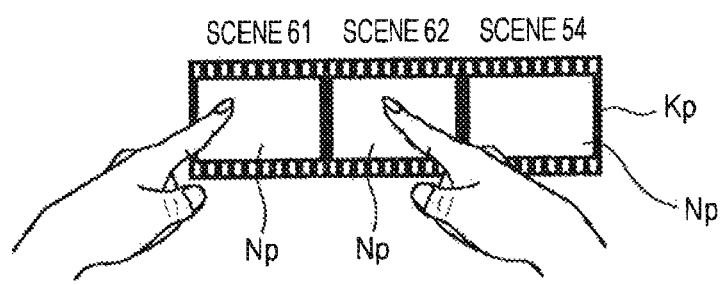
FIG. 11C

INFORMATION PROCESSING APPARATUS, DATA DIVISION METHOD, AND DATA DIVISION PROGRAM

CROSS-REFERENCE TO PRIOR APPLICATION

This application is a continuation of U.S. patent application Ser. No. 13/198,524 (filed on Aug. 4, 2011), which claims priority to Japanese Patent Application No. 2010-199350 (filed on Sep. 6, 2010), which are all hereby incorporated by reference in their entirety.

BACKGROUND

The present disclosure relates to an information processing apparatus, a data division method, and a data division program, and more particularly, to an information processing apparatus, a data division method, and a data division program which are suitably applied when editing temporally continuous data in a time-wise manner, such as moving image data, and the like.

In the related art, in an information processing apparatus that edits moving images, desired parts are cut from a moving image as a material, and the cut parts are connected in a desired order to thereby edit the moving images (see, Japanese Unexamined Patent Application Publication No. 2008-182765).

SUMMARY

However, in the above described information processing apparatus, when an image representing the contents of the moving image along a time axis is displayed, and a mouse is clicked by pointing a cursor on of a desired position of the image by a user, a starting point and an ending point are designated. Next, when the user clicks the mouse by pointing the cursor on a predetermined button in a state where the starting point and the ending point are designated, an interval between the starting point and the ending point having been designated at this time is cut out. In this manner, in the above described information processing apparatus, desired parts are to be cut out from the moving images.

Here, when it is possible to cut out a desired part by the user from the moving images by a more intuitive operation in comparison with the related art, it is considered that the operability of the information processing apparatus is significantly improved.

The present disclosure is to solve the above problem, and it is desirable to provide an information processing apparatus, a data division method, and a data division program, which may significantly improve operability in comparison with the related art.

According to an embodiment of the present disclosure, there is provided an information processing apparatus, including: an operation unit; and a control unit that displays, on a display unit, a data image representing the contents of temporally continuous data along a time axis. Here, when a gesture operation for cutting the data image perpendicularly to the time axis is performed through the operation unit, the control unit may divide the data at a position on the time axis in accordance with the position cut by the gesture operation.

In this manner, the data may be divided in accordance with a gesture operation for cutting the data image, representing the contents of the temporally continuous data along the time axis, perpendicularly to the time axis, so that it is possible to cut out a desired part by a user from a moving image by a more intuitive operation in comparison with the related art.

As described above, according to the embodiment of the present disclosure, the data may be divided in accordance with the gesture operation for cutting the data image, representing the contents of the temporally continuous data along the time axis, perpendicularly to the time axis, so that it is possible to cut out the desired part by the user from a moving image by a more intuitive operation in comparison with the related art. Thus, it is possible to realize an information processing apparatus, a data division method, and a data division program which may significantly improve operability in comparison with the related art.

BRIEF DESCRIPTION OF THE DRAWINGS

FIGS. 7A and 7B are outlined line drawings accompanying an explanation of division (1) of a sequence;

FIGS. 10A, 10B and 10C are outlined line drawings accompanying an explanation of an increase in the number of scenes;

FIGS. 11A, 11B and 11C are outlined line drawings accompanying an explanation of a reduction in the number of scenes;

DETAILED DESCRIPTION OF EMBODIMENTS

Hereinafter, best embodiments (corresponding to the following embodiments) for carrying out the present disclosure will now be described. Further, the description will be made in the following order:

1. Overview of embodiments
2. Specific example of embodiment
3. Another embodiment

1. Overview of Embodiment

First, an overview of embodiments will be described. Incidentally, after describing the overview, a specific example of an embodiment, and a specific example of another embodiment will be described.

Figure 1:
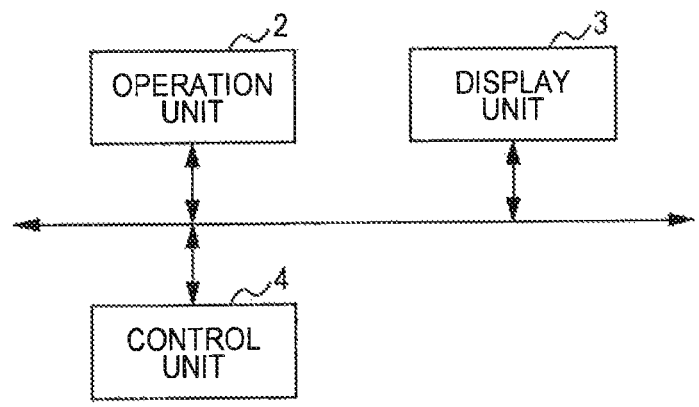
FIG. 1 is a block diagram showing a functional configuration of an information processing apparatus according to an embodiment of the present disclosure.

In FIG. 1, a reference numeral 1 indicates an information processing apparatus. In the information processing apparatus 1, an operation unit 2, and control unit 4 for displaying, on a display unit 3, a data image representing the contents of temporally continuous data along a time axis are provided.

When a gesture operation for cutting the data image perpendicularly to the time axis is performed through the operation unit 2, the control unit 4 divides the data at a position on the time axis corresponding to a position cut by the gesture operation.

In this manner, the information processing apparatus 1 divides the data in accordance with the gesture operation for cutting the data image, representing the contents of the temporally continuous data along the time axis, perpendicularly to the time axis. Thus, a user is able to cut a desired part from a moving image by a more intuitive operation in comparison with the related art.

More specifically, the temporally continuous data may be partitioned at arbitrary time intervals. In this case, the control unit 4 may handle each part of the partitioned data as partial data, and display, on the display unit 3, an image in which partial data images representing the contents of the partial data for each partial data are aligned in an order corresponding to the time series of the partial data. Next, the control unit 4 may divide the data at the position of a boundary of two pieces of partial data corresponding to the two partial data images when the gesture operation for cutting the data image perpendicularly to the time axis is performed through the operation unit 2 at the boundary of the two partial data images.

In addition, in this case, when a gesture operation for extending the data image along the time axis is performed, the control unit 4 may increase the number of the partial data items in the data by reducing the time interval into which the data is partitioned. Further, in this case, a gesture operation for contracting the data image along the time axis is performed, the control unit 4 may reduce the number of the unit data items in the data by increasing the time interval into which the data is partitioned.

Further, the control unit 4 may display a bar perpendicular to the time axis on a position corresponding to a reproduction position of the data on the data image while reproducing the data. In this case, when a gesture operation for tracing the bar is performed through the operation unit 2, the control unit 4 may divide the data in the reproduction position of the data.

In addition, in this case, when a gesture operation for tracing the data image along the time axis is performed through the operation unit 2, the control unit 4 may reproduce the data in the reproduction position in accordance with the position which is traced by the gesture operation.

Further, when a gesture operation for making a head on the time axis of the data image closer to a tail in a time axis of another data image is performed, the control unit 4 may connect two packets of the data corresponding to the data images.

Further, when a gesture operation for cutting the data image perpendicularly to the time axis is performed through the operation unit 2 while pressing the data image, the control unit 4 may divide the data at a position on the time axis in accordance with the position which is cut by the gesture operation.

Further, when a gesture operation for cutting the data image perpendicularly to the time axis is reciprocatively performed through the operation unit 2, the control unit 4 may divide the data at a position on the time axis in accordance with the position which is cut by the gesture operation.

A specific example of the information processing apparatus 1 having the above described configuration will be described in detail.

2. Specific Example of Embodiment

2-1. Hardware Configuration of Information Terminal

Figure 2:
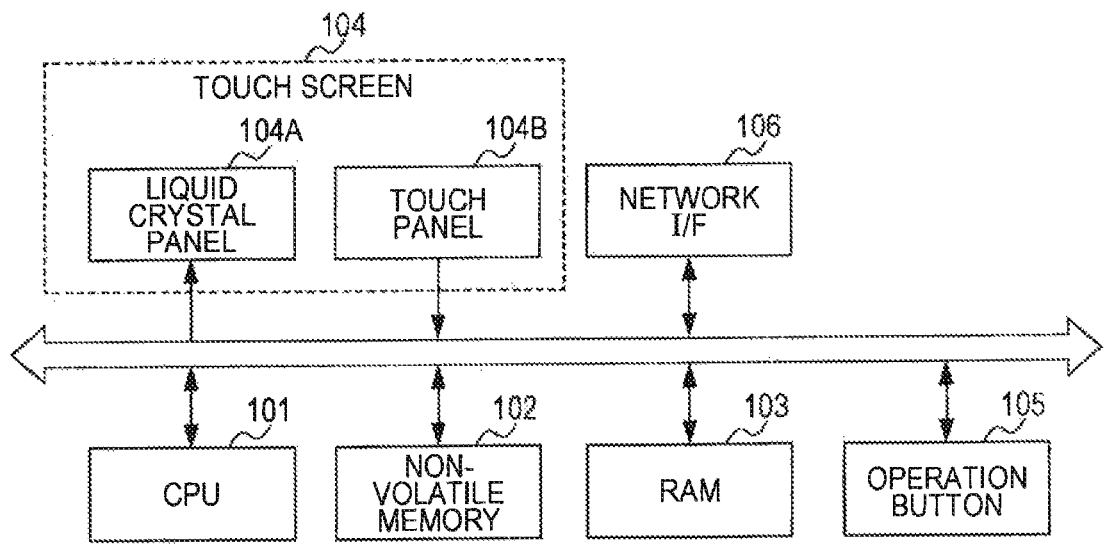
FIG. 2 is a block diagram showing a hardware configuration of an information terminal.

Next, a specific example of an embodiment will be described. First, using FIG. 2, a hardware configuration of an information terminal 100 that is a specific example of the above described information processing apparatus 1 will be described in detail.

In the information terminal 100, a CPU 101 develops and reads, in an RAM 103, a program stored in a nonvolatile memory 102 to thereby control each part while performing a variety of processes in accordance with the program. In addition, the CPU is abbreviated from a central processing unit, and the RAM is abbreviated from a random access memory.

In addition, the information terminal 100 receives a touch operation using a finger with respect to a touch screen 104 as an operation input by a user. The touch screen 104 includes a liquid crystal panel 104A that is a display device for displaying a variety of information, and a touch panel 104B that is an operation input device for receiving an operation input. Incidentally, the touch panel 104B is, for example, a capacitance type which support multi-touch.

When an arbitrary position on the touch panel 104B is touched by a finger, the touch panel 104B detects coordinates of the touched position (that is, touch position). Next, the touch panel 104B transmits an input signal indicating the coordinates of the touch position to a CPU 101.

In addition, the touch panel 104B transmits the input signal indicating the coordinates of the touch position to the CPU 101 at regular time intervals while being continuously touched, such as while being dragged or the like.

When the coordinates of the touch position are received the input signal transmitted from the touch panel 104B, the CPU 101 recognizes which position on a screen of the liquid crystal panel 104A is touched, by converting the coordinates to screen coordinates or the liquid crystal panel 104A. Consequently, the CPU 101 recognizes the touch position on the screen.

In addition, the CPU 101 converts the coordinates of the touch position received from the input signal transmitted at regular time intervals to the screen coordinates of a sequential liquid crystal panel 104A, and thereby recognizes how the touch position is moved (that is, trajectory of the touch position).

The CPU 101 specifies what kinds of gesture operation is performed with respect to the screen based on the recognized touch position and the trajectory of the recognized touch position, and receive this gesture operation as an operation input to thereby carry out a process corresponding to the operation input.

In addition, the CPU 101 receives, as the operation input, gesture operations such as touching (touch), tapping (touch and release), dragging (trace), flicking (sweep), holding (keep touching in the same position), and the like.

In addition, when recognizing a pressing operation with respect to an operation button 105, the CPU 101 receives the recognized pressing operation as the operation input caused by the user, and performs a process corresponding to the operation input.

Here, for example, it is assumed that a user taps a desired thumbnail in a state in which a thumbnail of an image that is stored as an image file in the nonvolatile memory 102 is displayed by a list on the touch screen 104.

The CPU 101 receives this operation as an operation input for reproducing an image, and reads the image file corresponding to the tapped thumbnail from the nonvolatile memory 102.

Here, in a case in which the corresponding image file is a still image file, the CPU 101 extracts still image data from the still image file. Next, the CPU 101 performs a predetermined reproduction process such as a decoding process, a digital-analog conversion process, and the like with respect to the still image data to thereby obtain a still image signal, and displays the obtained still image signal on the liquid crystal panel 104A of the touch screen 104.

Meanwhile, in a case in which the corresponding image file is a moving image file, the CPU 101 separates moving image data and audio data from the moving image file. Next, the CPU 101 performs a predetermined reproduction process such as the decoding process, the digital-analog conversion process, and the like with respect to the moving image data to thereby obtain a moving image signal, and displays the obtained moving image signal on the liquid crystal panel 104A of the touch screen 104. In addition, the CPU 101 performs a predetermined reproduction process such as the decoding process, the digital-analog conversion process, an amplification process, and the like with respect to the audio data to thereby obtain an audio signal, and outputs the obtained audio signal from a headphone terminal (not shown).

In this manner, the information terminal 100 reproduces an image designated by a user.

In addition, for example, it is assumed that a user taps a desired title in a state in which a music title that is stored as a music file in the nonvolatile memory 102 is displayed by a list.

The CPU 101 receives this operation as an operation input for reproducing the music, and reads the music file corresponding to the tapped title from the nonvolatile memory 102.

The CPU 101 extracts audio data from the music file. Next, the CPU 101 performs a predetermined reproduction process such as the decoding process, the digital-analog conversion process, the amplification process, and the like with respect to the audio data to thereby obtain a audio signal, and outputs the obtained audio signal from the headphone terminal (not shown).

In this manner, the information terminal 100 reproduces the music designated by the user.

In addition, in this instance, the CPU 101 extracts, related information such as a cover image, music title, album title, artist name, and the like from the read music file, and displays the extracted related information on the liquid crystal panel 104 of the touch screen 104.

In this manner, the information terminal 100 reproduces the music designated by the user, and to display information relating to the music while reproducing the music.

Further, for example, it is assumed that, in a state in which an icon corresponding to initiation of a web browser is displayed on the touch screen 104, a user taps the icon.

The CPU 101 receives this operation as an operation input for initiating the web browser, and initiates the web browser by reading and performing a program of the web browser from the nonvolatile memory 102.

Here, the CPU 101 receives page data of a web page from a server on the network through a network interface 106 while displaying a screen of the web browser on the liquid crystal panel 104A of the touch screen 104. Next, the CPU 101 displays a page image based on the page data on the screen of the web browser.

In this manner, the information terminal 100 displays the web page by initiating the web browser.

Incidentally, an example of a specific hardware of the operation unit 2 of the information processing apparatus 1 described in the overview of the embodiment is the touch panel 104B of the above described information terminal 100. In addition, an example of a specific hardware of the display unit 3 of the information processing apparatus 1 is the liquid crystal panel 104A of the information terminal 100. Further, an example of a specific hardware of the control unit 4 of the information processing apparatus is the CPU 101 of the information terminal 100.

2-2. Moving Image Editing Application

However, in the information terminal 100, a variety of applications (also simply called app) are able to be installed, and an application for editing a moving image (also called moving image editing app) is installed as one of the applications. Hereinafter, an operation input in the moving image editing application will be described in detail.

Figure 3:
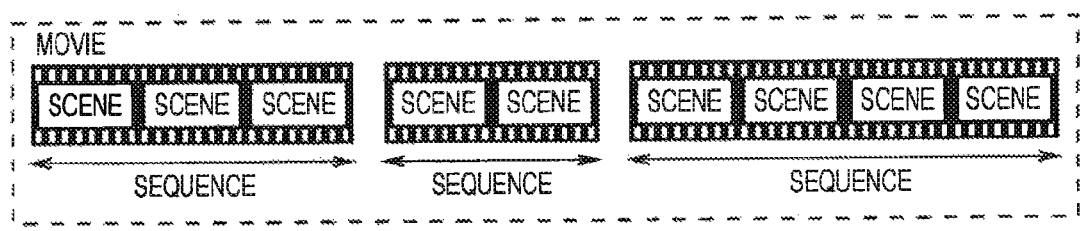
FIG. 3 is a outlined line drawing accompanying an explanation of a relationship among a scene, a sequence, and a movie.

In addition, in the moving image editing application, moving image data is handled using two units such as scene and sequence as shown in FIG. 3. Here, the sequence is a set of scenes. In addition, the scene is moving image data of an arbitrary interval extracted from the moving image data.

In the moving image editing application, the moving image is edited by dividing the sequence or connecting the sequence with another sequence, so that a new moving image (movie) is created as an edited result to thereby output the movie as a single moving image file.

When an icon corresponding to initiation of the moving image editing application is tapped in a state in which the icon is displayed on the touch screen 104, the CPU 101 receives this operation as an operation input for initiating the moving image editing application.

Next, the CPU 101 initiates the moving image editing application by reading and performing a program of the moving image editing application from the nonvolatile memory 102.

Figure 4:
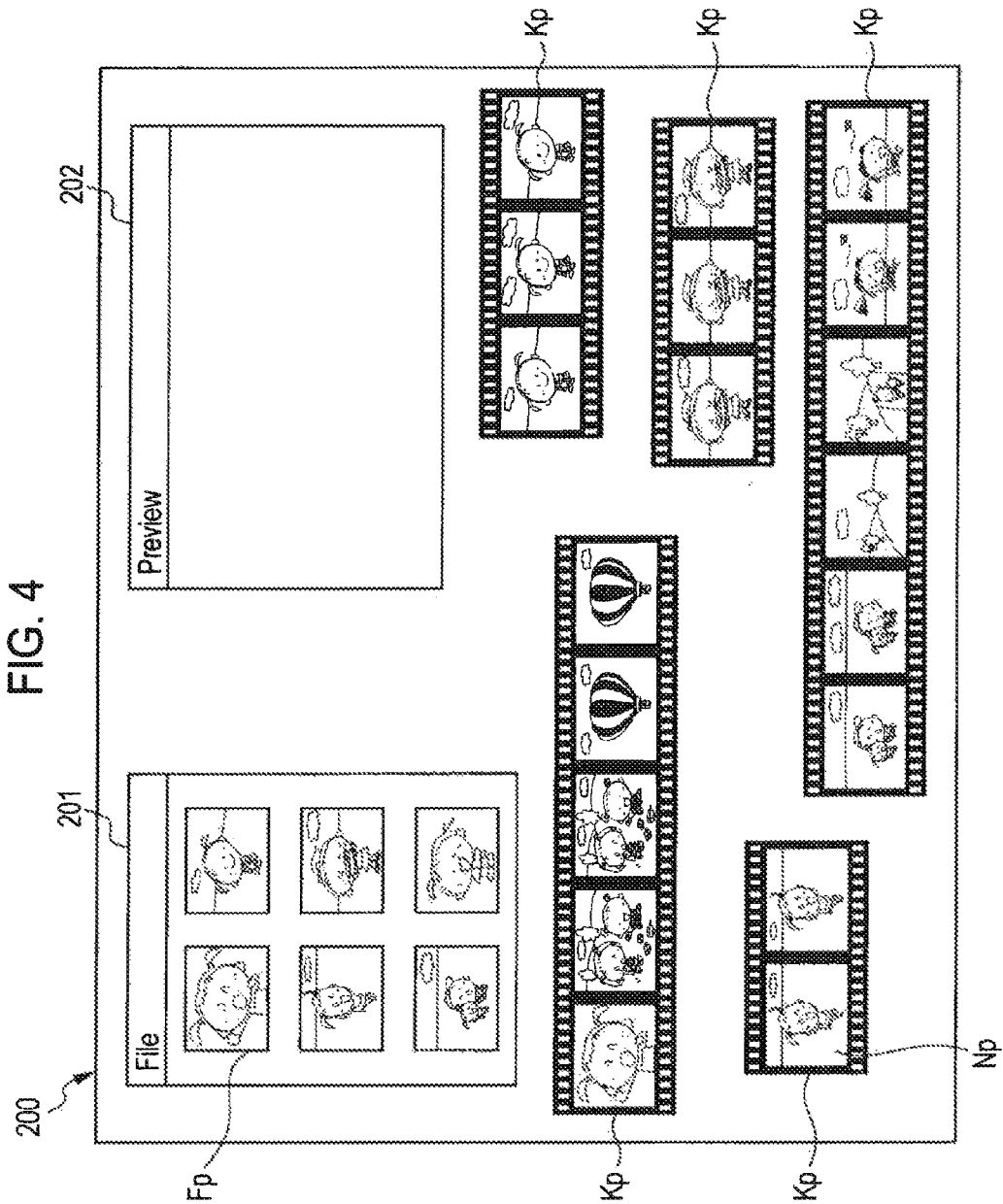
FIG. 4 is an outlined line drawing accompanying an explanation of an editing screen.

When initiating the moving image editing application, the CPU 101 displays an editing screen 200 shown in FIG. 4 on the touch screen 104.

On the editing screen 200, a file list window 201 in which a thumbnail image Fp (also called file image) of a moving image that is stored as the moving image file in the nonvolatile memory 102 is displayed by a list is displayed. Incidentally, the file image Fp is, for example, a thumbnail image of a head frame of the moving image.

Here, it is assumed that an operation of dragging with one finger within the file image Fp is performed. Then, the CPU 101 moves a display position of the file image Fp to correspond to the dragging.

Thereafter, it is assumed that the file image Fp is moved to a region outside the file list window 201 within the editing screen 200, and then the finger is released. Then, the CPU 101 imports the moving image file corresponding to the dragged file image Fp into the moving image editing application.

Specifically, the CPU 101 sets each of moving images divided for each predetermined time interval as a scene, and sets a set (that is, the moving image) of the scenes as a single sequence.

Next, the CPU 101 generates a thumbnail image Np (also called a scene image) of the head frame of the respective scenes. The CPU 101 generates a sequence image Kp obtained such that the scene images Np of the respective scenes are aligned in an order corresponding to the time series of the respective scenes from the left to the right, for example, such as the movie file, and the aligned scene images are connected. Consequently, the sequence image Kp displays the contents of the sequence along a time axis in which the time advances from the left to the right, and a horizontal direction of the sequence image Kp corresponds to the time axis of the sequence.

The CPU 101 displays the sequence image Kp at a position in which the file image Fp is dragged and the finger is released.

In this manner, on the editing screen 200, the sequence image Kp representing the contents of a desired moving image along the time axis is displayed in a desired position by dragging the file image Fp corresponding to a desired moving image to a region outside the file list window 201 by a user.

In addition, on the editing screen 200, a preview window 202 in which a reproduced moving image is displayed is displayed.

Here, it is assumed that an operation of dragging the file list window 201 or the preview window 202 with two fingers is performed. Then, the CPU 101 receives this operation as an operation input for moving a display position of the file list window 201 or the preview window 202, and moves the display positions thereof corresponding to the dragging.

In addition, it is assumed that an operation of dragging the sequence image Kp with two fingers is performed. Then, the CPU 101 receives this operation as an operation input for moving a display position of the sequence image Kp, and moves the display position of the sequence image Kp corresponding to the dragging. That is, on the editing screen 200, the display position is not moved for each scene image Np to correspond to the dragging, and the display position is moved for each sequence image Kp which is the collection of the scene images Np.

In this manner, on the editing screen 200, positions of the file list window 201, the preview window 202, and the sequence image Kp are able to be freely changed by a user dragging the file list window 201, the preview window 202, or the sequence image Kp with two fingers.

Figure 5:
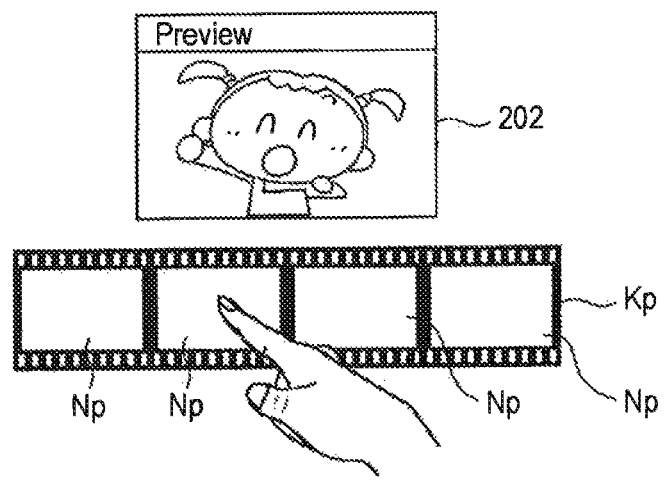
FIG. 5 is an outlined line drawing accompanying an explanation of reproduction (1) of a sequence.

In addition, as shown in FIG. 5, it is assumed that an operation in which the scene image Np is tapped within the sequence image Kp is performed. Then, the CPU 101 receives this operation as an operation input for reproducing a sequence, and reproduces a sequence corresponding to the sequence image Kp from the head frame of a scene corresponding to the tapped scene image Np to thereby display the reproduced sequence on the preview window 202.

In this manner, on the editing screen 200, a desired sequence by a user is able to be reproduced from a desired scene.

In addition, when tapping is performed within the preview window 202 while the sequence is reproduced, the CPU 101 temporarily stops the reproduction of the sequence. Thereafter, when tapping is repeatedly performed within the preview window 202, the CPU 101 reproduces the sequence starting from a position in which the reproduction of the sequence is temporarily stopped.

Figure 6:
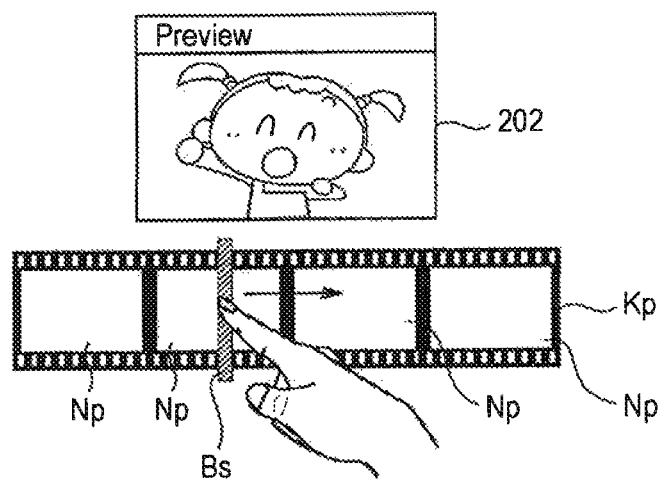
FIG. 6 is an outlined line drawing accompanying an explanation of reproduction (2) of a sequence.

In addition, as shown in FIG. 6, it is assumed that an operation of dragging with one finger within the sequence image Kp in a horizontal direction (that is, direction parallel to the time axis) is performed.

Then, the CPU 101 reproduces a sequence corresponding to the sequence image Kp at a position on the time axis corresponding to a touch position, and displays the reproduced sequence on the preview window 202. In this instance, the CPU 101 switches a display of the preview window 202 while changing the reproduction position of the sequence to correspond to the movement (that is, dragging) of the touch position.

In addition, in the sequence image Kp, the position in the horizontal direction within each of the scene images Np corresponds to a position on the time axis within each scene. In addition, as described above, the horizontal direction of the sequence image Kp corresponds to the time axis of the sequence, and the time advances from the left to the right. Accordingly, in each of the scene images Np, the position of a left end corresponds to the head frame of each scene, and the position of a right end corresponds to an end frame of each scene. In addition, the position in the horizontal direction within each of the scene images Np corresponds to the position (that is, elapsed time from the head of each scene) on the time axis within each scene.

Thus, when the touch position is in the left end of the scene image Np, the CPU 101 displays an image of a head frame of a scene corresponding to the scene image Np on the preview window 202.

In addition, in this instance, the CPU 101 superimposes and displays, on the sequence image Kp, a vertically long bar-shaped seek bar Bs which is slightly longer than a vertical width of the sequence image Kp, and moves the seek bar Bs in the horizontal direction in accordance with the dragging. That is, the seek bar Bs displays the current reproduction position of the sequence.

In addition, the reproduction of the sequence performed while changing the reproduction position in accordance with the dragging will be hereinafter referred to as seek-reproduction, and the reproduction position of the sequence displayed by the seek bar Bs will be hereinafter referred to as a seek position.

In this manner, on the editing screen 200, an operation (that is, gesture operation in which tracing is performed along the time axis) for dragging the sequence image Kp with one finger in a direction parallel to the time axis is received as an operation input in which a seek-reproduction is performed with respect to the sequence. Thus, the reproduction position of the sequence is able to be changed to a desired position by a user, so that it is possible to retrieve (a so-called seek) the contents of the sequence (that is, the contents of the moving image).

In addition, when the finger is released and the dragging is completed, the CPU 101 leaves, as displayed on the preview window 202, an image of the reproduction position at the point of time when the finger is released (that is, being in a state of being temporarily stopped in the reproduction position). In addition, the CPU 101 leaves the seek bar Bs as displayed.

Thereafter, in a case in which the sequence image Kp is tapped, the CPU 101 removes the seek bar Bs from the screen, and switches a display of the preview window 202 to a moving image of the sequence corresponding to the tapped sequence image Kp.

Meanwhile, thereafter, in a case where an operation of dragging with respect to the sequence image Kp with one finger in a horizontal direction is performed, the CPU 101 removes the seek bar Bs displayed until now from the screen, and displays the seek bar Bs in a new touch position. At the same time, the CPU 101 switches the position of the preview window 202 to an image of a reproduction position corresponding to the new touch position (display position of the seek bar Bs).

In addition, as shown in FIG. 7A, a sequence image Kp of a sequence 1 having a scene 1 to scene 5 is displayed on the editing screen 200. Here, it is assumed that an operation of holding with one finger within the sequence image Kp is performed. Then, the CPU 101 receives this operation as an operation input for selecting the sequence as an editing target, and selects a sequence (here, sequence 1) corresponding to the held sequence image Np as the editing target.

In addition, when the held finger is released, the CPU 101 cancels the selection of the sequence as the editing target.

Here, it is assumed that an operation in which a boundary between a scene image Np of the scene 2 and a scene image Np of the scene 3 is traced (dragged) downward by another single finger is performed while holding within the sequence image Kp with one finger.

Then, the CPU 101 receives this operation as an operation input for dividing the sequence selected as the editing target at the boundary between two scenes. Next, the CPU 101 divides the sequence 1 at the boundary between the scene 2 and the scene 3 as shown in FIG. 7B, sets the scene 1 and the scene 2 as a new sequence 2, and sets the scenes 3 to 5 as a new sequence 3.

In addition, in this instance, the CPU 101 segments the sequence image Kp of the sequence 1 at the boundary between the scene image Np of the scene 2 and the scene image Np of the scene 3, and utilizes the segmented sequence image Kp as the sequence image Kp of the new sequence 2 and the sequence image Kp of the new sequence 3.

Figure 8A:
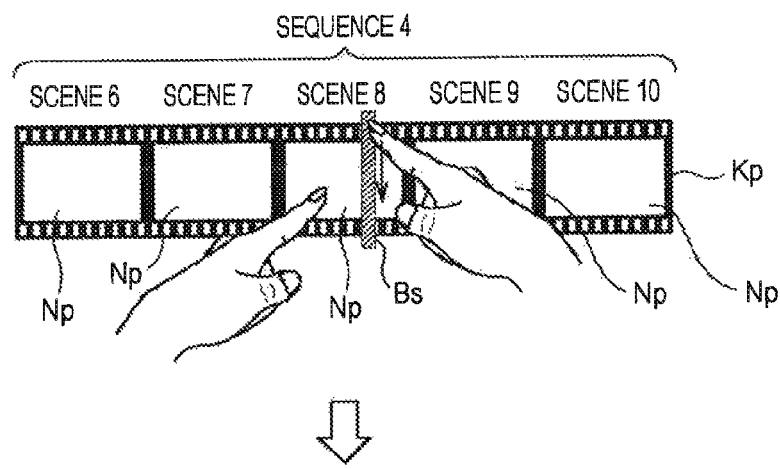
FIGS. 8A, 8B and 8C are outlined line drawings accompanying an explanation of division (2) of a sequence.

Meanwhile, as shown in FIG. 8A, it is assumed that a sequence image Kp of a sequence 4 having scenes 6 to 10 is displayed on the editing screen 200, and the seek bar Bs is displayed on a scene image Np of a scene 8. Here, it is assumed that an operation of holding with one finger within the sequence image Kp is performed. Then, the CPU 101 selects a sequence (here, sequence 4) corresponding to the held sequence image Kp as the editing target.

In addition, it is assumed that an operation in which the seek bar Bs is traced (dragged) downward by another single finger while holding with one finger within the sequence image Kp is performed.

Figure 8B:
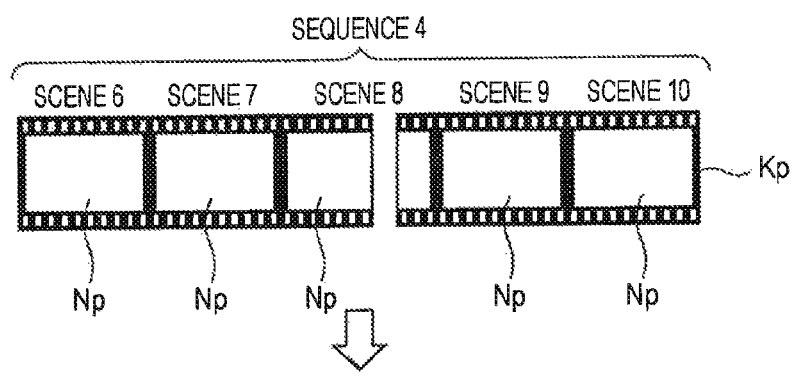

Then, the CPU 101 receives this operation as an operation input for dividing the sequence selected as the editing target in a seek position. Next, as shown in FIG. 8B, the CPU 101 divides the scene 8 and the sequence 4 at a position on the time axis of the scene 6 in which the seek bar Bs is displayed.

Figure 8C:
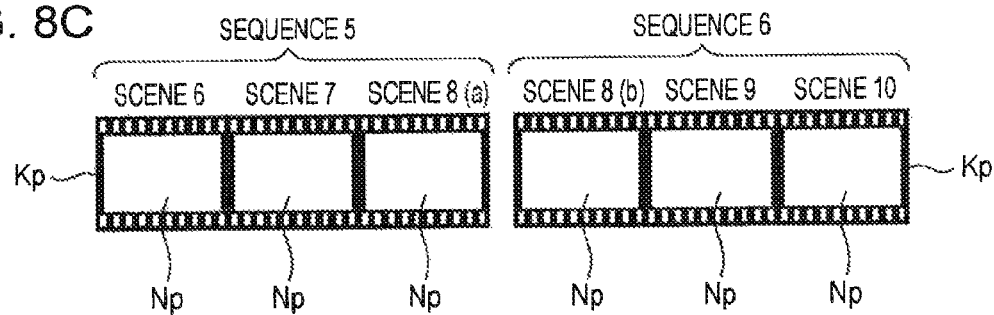

Next, as shown in FIG. 8C, the CPU 101 sets a moving image ranging from the head of the scene 8 to the position of the division as a new scene 8(*a*), and sets a moving image ranging from the position of the division to the end of the scene 8 as a new scene 8(*b*). In addition, the CPU 101 sets the scenes 6 to 8(*a*) as a new sequence 5, and sets the scenes 8(*b*) to 10 as a new sequence 6.

In addition, as shown in FIG. 8(*b*), the CPU 101 divides a scene image Np of the scene 8 in a display position of the seek bar Bs to thereby sequent the sequence image Kp of the sequence 4.

Thereafter, as shown in FIG. 8C, the CPU 101 displays the scene image Np of the scene 8(*a*) on the right side of the scene image Np of the scene 7, and utilizes the collection of the scene images Np of the scenes 6 to 8(*a*) as a sequence image Kp of a new sequence 5. At the same time, the CPU 101 displays the scene image Np of the scene 8(*b*) on the left side of the scene image Np of the scene 9, and utilizes the collection of the scene images Np of the scenes 8(*b*) to 10 as a sequence image Np of a new sequence 6.

In this manner, while holding the sequence image Np with one finger, the CPU 101 receives, as an operation input for dividing the sequence, an operation of dragging with another single finger within the sequence image Kp in the horizontal direction (that is, a direction perpendicular to the time axis).

In other words, while pressing the sequence image Kp with one finger, the CPU 101 receives, as the operation input for dividing the sequence, a gesture operation for cutting the sequence image Kp with another single finger perpendicularly to the time axis.

Next, when a position cut by the gesture operation is at the boundary of the scene image Np, the CPU 101 divides a sequence at the boundary of a scene, and when the position cut by the gesture operation is in the display position of the seek bar Bs, the CPU 101 divides the sequence in the seek position.

In addition, even though a position in which dragging is performed perpendicularly to the time axis is not strictly the boundary of the scene image Np or the display position of the seek bar Bs, the CPU 101 recognizes the dragging as a gesture operation for cutting the boundary of the scene image Np or the display position of the seek bar Bs.

Specifically, when the seek bar Bs is not displayed, the CPU 101 recognizes the dragging as a gesture operation for cutting a boundary of a scene image Np closest to the position in which the dragging is performed perpendicularly to the time axis.

In addition, when the seek bar Bs is displayed, the CPU 101 determines that the position in which the dragging is performed perpendicularly to the time axis is closer to either the boundary of the scene image Np or the display position of the seek bar Bs. Next, when the position is closer to the boundary of the scene image Np, the CPU 101 recognizes the dragging as a gesture operation for cutting the boundary of the scene image Np closest to the position in which the dragging is performed perpendicularly to the time axis. Meanwhile, when the position is closer to the seek bar Bs, the CPU 101 recognizes the dragging as a gesture operation (that is, a gesture operation for tracing the seek bar Bs) for cutting in the display position of the seek bar Bs.

Figure 9A:
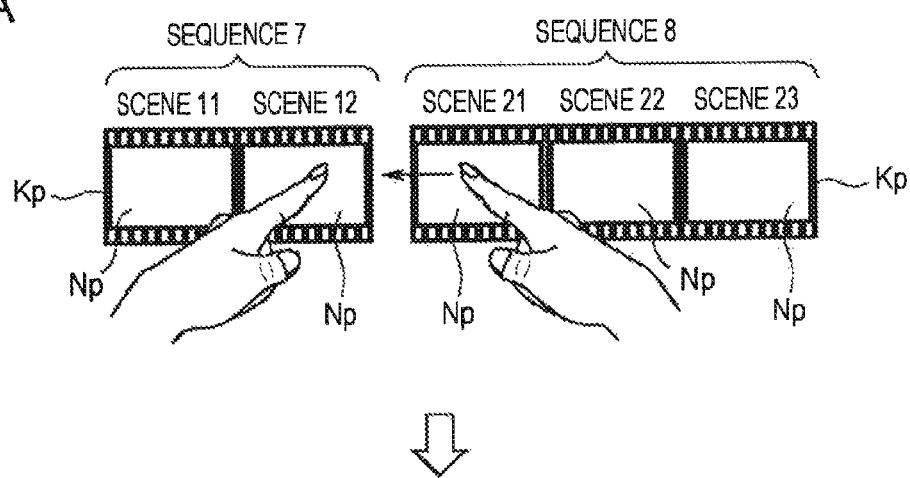
FIGS. 9A and 9B are outlined line drawings accompanying an explanation of connection of a sequence.

In addition, as shown in FIG. 9A, a sequence image Kp of a sequence 7 having scenes 11 to 12, a sequence image Kp of a sequence 8 having scenes 21 to 23 are displayed on the editing screen 200. Here, it is assumed that an operation of holding the sequence image Kp of the sequence 7 with one finger is performed. Then, the CPU 101 selects a sequence (here, the sequence 7) corresponding to the held sequence image Kp as the editing target.

Next, it is assumed that an operation for dragging with one finger within the sequence image Kp of the sequence 8 is performed while holding the sequence image Kp of the sequence 7 with one finger.

Then, the CPU 101 selects the sequence 8 as well as the sequence 7 as the editing target, and moves the display position of the sequence image Kp of the sequence 8 in accordance with the dragging.

Thereafter, it is assumed that a scene image Np of the end scene (scene 12) of the sequence 7 approaches a scene image Np of the head scene (scene 21) of the sequence 8, so that the distance therebetween is set to be a predetermined value or less.

Figure 9B:
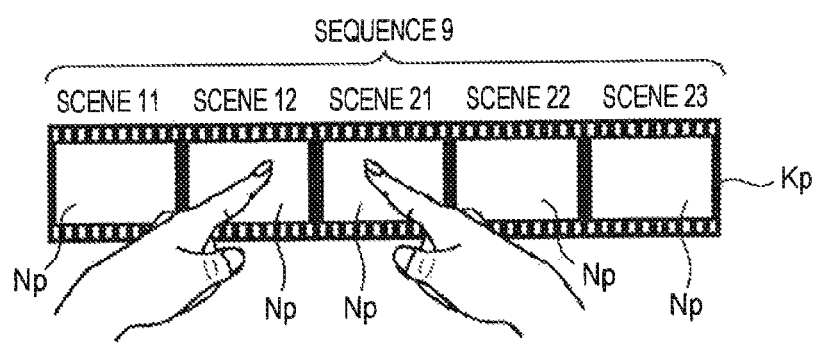

Then, the CPU 101 receives this operation as an operation input for connecting two sequences selected as the editing target. Next, as shown in FIG. 9B, the CPU 101 connects the two sequences by connecting the end scene of the sequence 7 and the head scene of the sequence 8, and sets the scenes 11 to 12 and the scenes 21 to 23 as a new sequence 9.

In addition, in this instance, the CPU 101 connects the sequence 7 and the sequence image Kp of the sequence 8 by connecting the right side of the scene image Np of the scene 12 and the left side of the scene image Np of the scene 21, and utilizes this as a sequence image Kp of a new sequence 9.

Meanwhile, as a result in which the sequence image Kp of the sequence 8 is dragged, the scene image Np of the end scene (scene 23) of the sequence 8 approaches the scene image Np of the head scene (scene 11) of the sequence 7, so that the distance therebetween is set to be a predetermined value or less.

In this case, the CPU 101 connects two sequences by connecting the end scene of the sequence 8 and the head scene of the sequence 7.

In addition, the CPU 101 connects only sequences that are selected by the editing target. That is, even though the sequence image Kp of the sequence 8 approaches a sequence image Kp of a sequence that is not selected as the editing target as a result of being dragged, the CPU 101 is set not to connect the sequence and the sequence 8.

In this manner, the CPU 101 connects two sequences corresponding to the two sequence images Kp in accordance with a gesture operation for making the head of the sequence image Kp on the time axis and the end of another sequence image Kp on the time axis approach each other.

As described above, on the editing screen 200, it is possible to divide or connect the sequence in accordance with a user's request, and to perform editing of a moving image in accordance with a user's request.

Further, on the editing screen 200, it is possible to change the number of scenes within the sequence.

As shown in FIG. 10A, it is assumed that a sequence image Kp of a sequence 10 having scenes 31 to 34 is displayed on the editing screen 200. Here, it is assumed that an operation for holding with one finger within the sequence image Kp of the sequence 10 is performed. Then, the CPU 101 selects a sequence (here, the sequence 10) corresponding to the held sequence image Kp as the editing target.

In addition, in this instance, it is assumed that, while holding within a scene image Np of the scene 32 within the sequence image Kp with one finger, an operation for touching a scene image Np of the scene 33 with another finger, and dragging in the right direction (direction for increasing an interval of the two fingers in a horizontal direction) is performed. In addition, here, it is assumed that a touch position of the held finger is on the left side of the screen, and a touch position of the dragged finger is on the right side of the screen.

Then, the CPU 101 receives this operation as an operation input for increasing the number of scenes in the sequence selected as the editing target. Next, as shown in FIG. 10B, the CPU 101 stretches the widths of the scene images Np of the touched scenes 32 to 33 equally in accordance with the dragging in the right direction.

Next, when an operation amount of the dragging in the horizontal direction, that is, a change amount of an interval of the touch position in the horizontal direction reaches one width of the scene image Np, the CPU 101 increases the number of scenes by 1 in the moving image from the head of the scene 32 to the end of the scene 33, so that the number of scenes is 3.

Specifically, the CPU 101 divides the moving image (moving image connecting scenes 32 and 33) from the head of the scene 32 to the end of the scene 33 into three, and sets each of the moving image divided into three as new scenes 41, 42, and 43, as shown in FIG. 10C.

For example, when it is assumed that the length of each of the scenes 32 and 33 is 15 minutes, the length of the moving image from the head of the scene 32 to the end of the scene 33 is 30 minutes, and when dividing the moving image into three, a length per scene is set to be 10 minutes.

In this manner, when setting the new scenes 41, 42, and 43, the CPU 101 switches a display of the scene image Np of each of the scenes 32 and 33 to the scene image Np of each of the new scenes 41, 42, and 43.

Similarly, when an operation amount of the dragging in the horizontal direction reaches two widths of the scene image Np, the number of scenes in the moving image from the head of the scene 32 to the end of the scene 33 is increased by 2 in comparison with before the dragging, and when the operation amount thereof reaches three widths of the scene image Np, the number of scenes in the moving image is increased by 3 in comparison with before the dragging.

In this manner, the CPU 101 receives an operation for increasing an interval between two fingers touching within the sequence image Kp, that is, a gesture operation for stretching the sequence image Kp as an operation input for increasing the number of the scenes in the sequence. Next, the CPU 101 further shortens a time interval for setting scene in the moving image connecting scenes existing between two fingers, resulting in an increase in the number of scenes.

Thus, in the editing screen 200, it is possible to increase the number of scenes in a sequence by an intuitive operation, and it is possible to perform editing in a fine unit with respect to the sequence, that is, to perform local editing.

In addition, as shown in FIG. 11A, it is assumed that a sequence image Kp of a sequence 11 having scenes 51 to 54 is displayed on the editing screen 200. Here, it is assumed that an operation of holding with one finger within the sequence image Kp of the sequence 11 is performed. Then, the CPU 101 selects a sequence (here, sequence 11) corresponding to the held sequence image Kp as the editing target.

In addition, in this instance, it is assumed that, while holding a scene image Np of the scene 51 with one finger, an operation of dragging a scene image Np of the scene 53 with one finger in the left direction (direction for narrowing an interval of the two fingers in the horizontal direction) is performed. In addition, in this instance, a touch position of the held finger is on the left side of the screen, and a touch position of the dragged finger is on the right side of the screen.

Then, the CPU 101 receives this operation as an operation input for reducing the number of scenes in the sequence that is selected by the editing target. Next, as shown in FIG. 11B, the CPU 101 evenly reduces the widths of the scene images Np of the touched scenes 51 to 53 in accordance with the dragging the left direction.

Next, when an operation amount of the dragging in the horizontal direction, that is, a change amount of an interval of the touch position in the horizontal direction reaches one width of the scene images Np, the CPU 101 reduces the number of scenes by 1 in the moving image from the head of the scene 51 to the end of the scene 53, so that the number of scenes is set to be 2.

Specifically, the CPU 101 divides the moving image (moving image connecting scenes 51 to 53) from the head of the scene 51 to the end of the scene 53 into two, and as shown in FIG. 11C, sets each of the moving image divided into two as new scenes 61 to 62.

For example, when the length of each of the scenes 51 to 53 is 10 minutes, the length of the moving image from the head of the scene 51 to the end of the scene 53 is 30 minutes, and when the moving image is divided into three, a length per scene is 15 minutes. That is, the length of each of the scenes 61 and 62 is 15 minutes.

In this manner, when the new scenes 61 and 62 are set, the CPU 101 replaces a display of the scene image Np of the scenes 51 to 53 with a scene image Np of the scenes 61 and 62.

Similarly, when an operation amount of the dragging in the horizontal direction reaches double the width of the scene image Np, the number of scenes in the moving images from the head of the scene 51 to the end of the scene 53 is reduced by 2 in comparison with before the dragging, and when the operation amount thereof is triple the width of the scene image Np, the number of scenes in the moving images is reduced by 3 in comparison with before the dragging.

In this manner, the CPU 101 receives an operation for narrowing an interval between two fingers touching within the sequence image Kp, that is, a gesture operation for contracting the sequence image Kp, as an operation input for reducing the number of scenes in the sequence. Thus, on the editing screen 200, is possible to reduce the number of scenes in the sequence by an intuitive operation, and it is possible to perform editing on a greater unit with respect to the sequence, that is, to perform global editing.

In addition, on the editing screen 200, it is possible to set a transition for the joining of the scenes in each of the sequences.

Figure 12A:
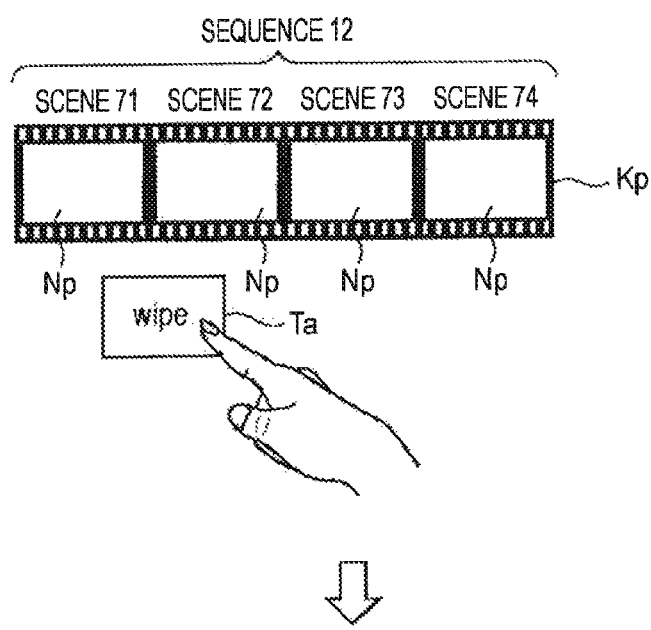
FIGS. 12A and 12B are outlined line drawings accompanying an explanation of setting of a transition.

Specifically, on the editing screen 200, a transition icon Ta indicating each transition is displayed for each transition such as fade-in, fade-out, wipe, and the like in accordance with a user's operation. As shown in FIG. 12A, a display position of the transition icon Ta is able to be moved by dragging with one finger.

Here, it is assumed that a sequence image Kp of a sequence 12 having scenes 71 to 74 is displayed on the editing screen 200. In this instance, it is assumed that the transition icon Ta is dragged with one finger to approach a boundary between a scene image Np of the scene 71 and a scene image Np of the scene 72, so that a distance between the boundary and the transition icon Ta is set to be a predetermined value or less.

Figure 12B:
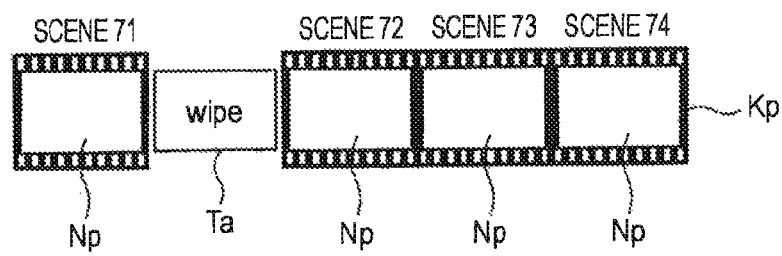

Then, the CPU 101 receives this operation as an operation input for setting the transition, and sets the transition (here, wipe) corresponding to the dragged transition icon Ta on the joint between the scenes 71 and 72. With this configuration, as shown in FIG. 12B, the CPU 101 separates the scene image Np of the scene 71 and the scene image Np of the scene 72 in the sequence image Kp, and inserts the transition icon Ta into therebetween.

Thus, on the editing screen 200, it is possible to set a desired transition for a desired joint of scenes.

Further, on the editing screen 200, it is possible to set BGM (background music) in each sequence.

Figure 13A:
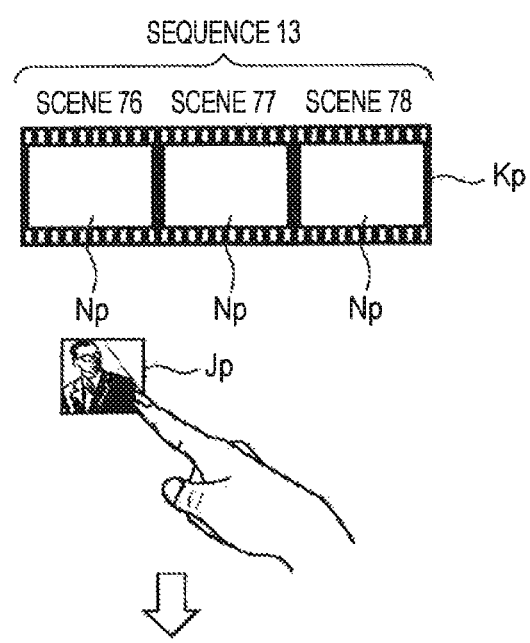
FIGS. 13A and 13B are outlined line drawings accompanying an explanation of setting of BGM.

Specifically, on the editing screen 200, a cover picture image Jp of each piece of music is displayed by a list for each piece of music stored as the music file in the nonvolatile memory 102, in accordance with a user's operation. As shown in FIG. 13A, a display position of the cover picture image Jp is able to be moved by dragging with one finger.

Here, it is assumed that a sequence image Kp of a sequence 13 having scenes 76 to 78 is displayed. In this instance, it is assumed that the cover picture image Jp is dragged with one finger to approach a left end (that is, a position indicating the head of the sequence 13) of the sequence image Kp, so that a distance between the left end and the cover picture image Jp is a predetermined value or less.

Then, the CPU 101 receives this operation as an operation input for setting the BGM, and sets the music corresponding to the dragged cover picture image Jp as the BGM for reproducing starting from the head of the sequence 13.

Figure 13B:
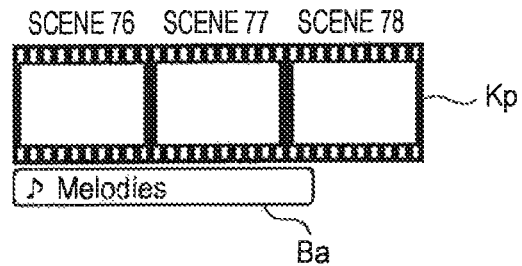

At the same time, the CPU 101 animates the cover picture image Jp to be adhered to the lower side of the sequence image Kp, and changes the cover picture image Jp to a BGM icon Ba. As shown in FIG. 13B, the BGM icon Ba in a laterally long rectangular shape is displayed near the lower side of the sequence image Kp, and a title of the music set as the BGM is displayed on the BGM icon Ba.

In addition, the width of the BGM icon Ba indicates a reproduction range of the BGM. For example, as shown in FIG. 13B, when the width of the BGM icon Ba corresponds to the length from the left end of a scene image Np of the scene 76 to the middle of a scene image Np of the scene 78, reproduction of the BGM is instructed from the head of the scene 76 to the middle of the scene 78.

Thus, on the editing screen 200, it is possible to set a desired piece of music as the BGM of a desired sequence.

Figure 14A:
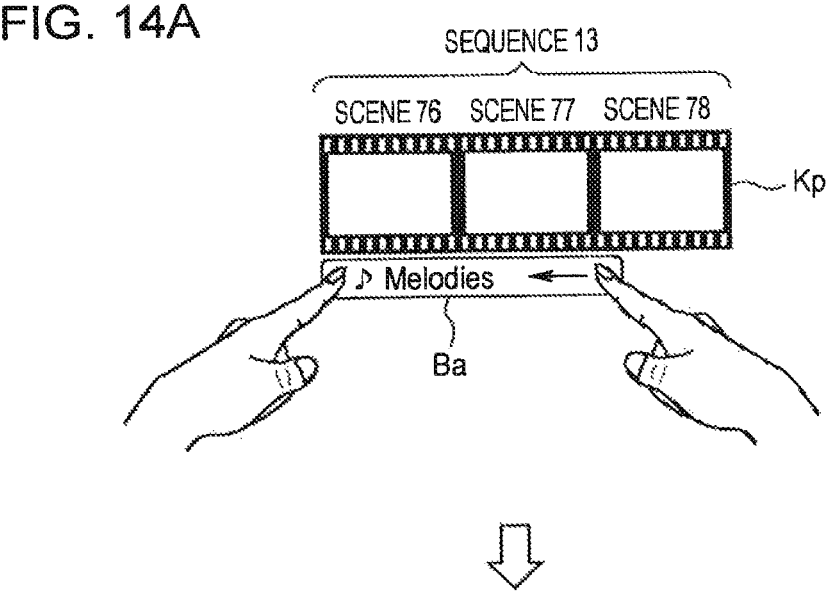
FIGS. 14A and 14B are outlined line drawings accompanying an explanation of a change in a reproduction range of BGM.

In addition, after the BGM is set, as shown in FIG. 14A, it is assumed that, while holding the BGM icon Ba with one finger, an operation of touching the BGM icon Ba with another finger, and dragging the BGM icon Ba in the left direction (direction for narrowing an interval of the two fingers in the horizontal direction) is performed. In addition, in this instance, it is assumed that the held finger is on the left side, and the dragged finger is on the right side.

Figure 14B:
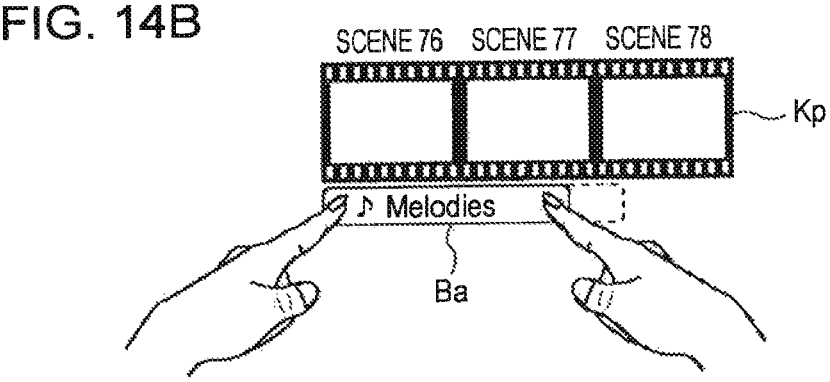

Then, as shown in FIG. 14B, the CPU 101 contracts the BGM icon Ba in the left direction from the right side in accordance with the dragging in the left direction, and sets a reproduction range of the BGM as a range indicated by the width of the BGM icon Ba after the BGM icon Ba is contracted.

As an example, in FIG. 14B, the reproduction range of the BGM is contracted to a range from the scene 76 to the middle of the scene 77.

Meanwhile, it is assumed that, while holding the BGM icon Ba with one finger, an operation of touching the BGM icon Ba with another finger, and dragging the BGM icon Ba in a direction of increasing an interval of the two fingers in the horizontal direction is performed.

In this case, the CPU 101 extends the width of the BGM icon Ba in accordance with the dragging, and sets the reproduction range of the BGM to a range indicated by the width of the BGM icon Ba after the width is extended.

In this manner, on the editing screen 200, it is possible to expand and contract the reproduction range of the BGM in accordance with an operation of dragging the BGM icon Ba with another finger in the horizontal direction while holding the BGM icon Ba with one finger, that is, a gesture operation for expanding and contracting the BGM icon Ba.

Further, on the editing screen 200, effect is able to be set for each scene in each sequence.

Figure 15A:
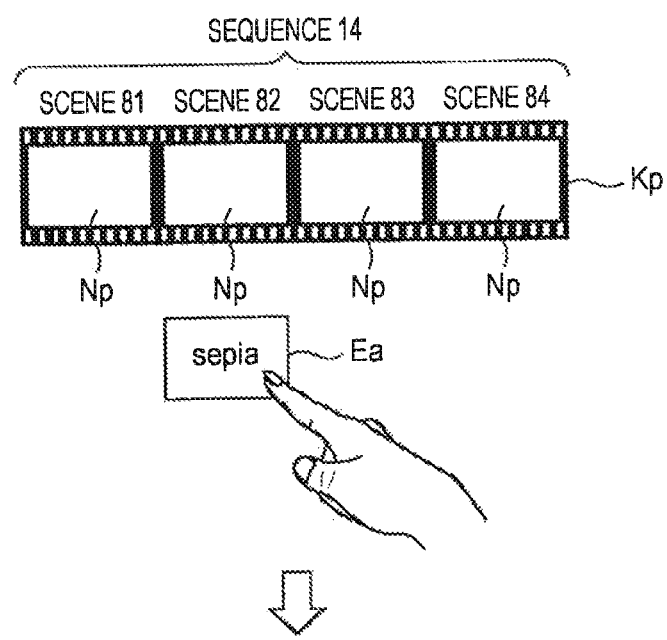
FIGS. 15A and 15B are outlined line drawings accompanying an explanation of setting of an effect.

Specifically, on the editing screen 200, an effect icon Ea for indicating each effect is displayed for each effect such as monotone, sepia, and the like, in accordance with a user's operation. As shown in FIG. 15A, a display position of the effect icon Ea is able to be moved by dragging with one finger.

Here, it is assumed that a sequence image Kp of a sequence 14 having scenes 81 to 84 is displayed. In this instance, it is assumed that an effect icon Ea indicating sepia is dragged with one finger to approach a scene image Np of the scene 82, so that a distance between the effect icon Ea and the scene image Np of the scene 82 is a predetermined value or less.

Figure 15B:
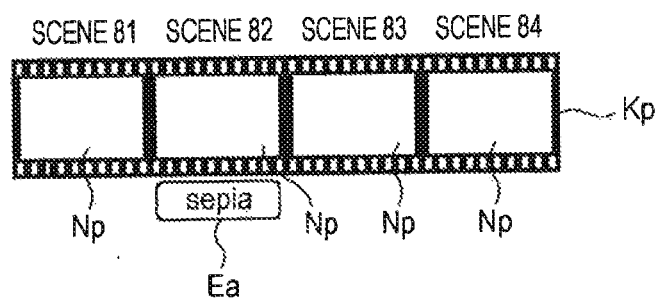

Then, the CPU 101 receives this operation as an operation input for setting the effect, and sets the effect (here, sepia) indicated by the dragged effect icon Ea in the scene 82. At the same time, as shown in FIG. 15B, the CPU 101 animates the effect icon Ea to be sucked on a lower side of the scene image Np, and is changed to a laterally long rectangular shape.

The width of the effect icon Ea indicates an application range of the effect. For example, as shown in FIG. 15B, the width of the effect icon Ea is shown as the same width as that of a scene image Np of the scene 82, and indicates that the effect of the sepia is set in the scene 82.

Thus, on the editing screen 200, it is possible to set a desired effect in a desired scene.

Figure 16A:
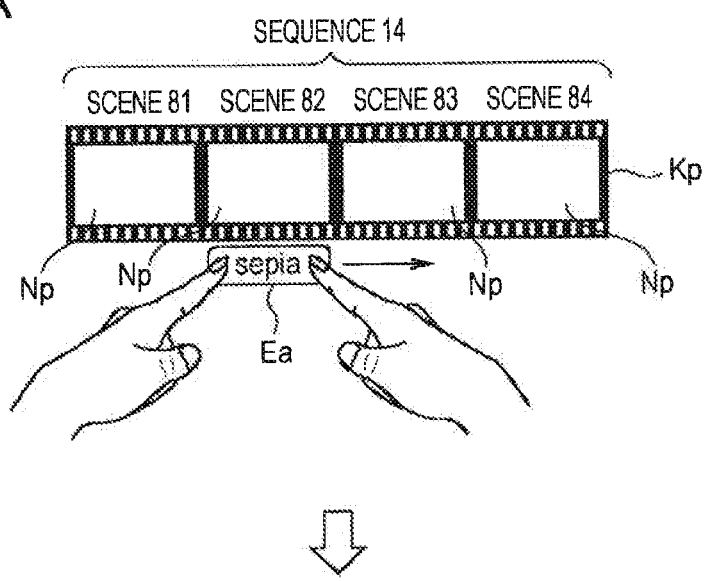
FIGS. 16A and 16B are outlined line drawings accompanying an explanation of a change in an application range of effect.

In addition, as shown in FIG. 16A, it is assumed that, while holding the effect icon Ea with one finger after the effect is set, an operation of touching the effect icon Ea with another finger, and dragging the effect icon Ea in a right direction (a direction for increasing an interval of the two fingers) is performed. In addition, it is assumed that the held finger is on the left side, and the dragged finger is on the right side.

Figure 16B:
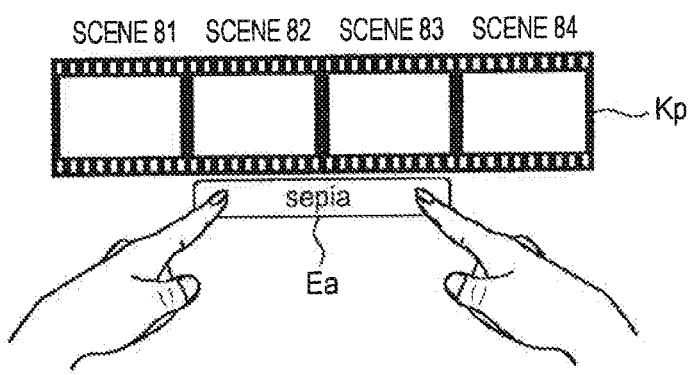

Then, as shown in FIG. 16B, the CPU 101 extends the effect icon Ea in the right direction from the right side in accordance with dragging in the right direction. Next, when an operation amount of the dragging in the horizontal direction, that is, a change amount in an interval of a touch position in the horizontal direction reaches one width of the scene images Np, the CPU 101 increases the application range of the effect up to a right adjacent scene 83.

Similarly, when the operation amount of the dragging in the horizontal direction is double of width of the scene images Np, the CPU 101 increases the application range of the effect by two scenes in comparison with before the dragging, and when the operation amount thereof is triple of width of the scene images Np, the CPU 101 increases the application range of the effect by three scenes in comparison with before the dragging. That is, the CPU 101 changes the application range of the effect in a scene unit.

In addition, meanwhile, it is assumed that, while holding the effect icon Ea with one finger, an operation for touching the effect icon Ea with another finger, and dragging the effect icon Ea in a direction narrowing the interval of the two fingers is performed.

In this case, the CPU 101 contracts the width of the effect icon Ea in accordance with the dragging, and reduces the application range of the effect by one scene when the operation amount of the dragging in the horizontal direction reaches one width of the scene image Np.

In this manner, on the editing screen 200, it is possible to expand and contract the application range of the effect in accordance with an operation for dragging the effect icon Ea with one finger in the horizontal direction while holding the effect icon Ea with another finger, that is, a gesture operation for expanding and contracting the effect icon Ea.

In addition, a case of dividing the sequence in which the transition, the effect, or the BGM are set in the above described manner will be herein described.

For example, with respect to the sequence image Kp corresponding to the sequence in which the transition is set, a gesture operation for cutting the sequence image Kp with one finger perpendicularly to the time axis while pressing the corresponding sequence image Kp with another finger is performed.

Then, in a case in which a position cut by the gesture operation is at the boundary of the scene image Np corresponding to a scene boundary in which a transition is set.

The CPU 101 cancels the setting of the transition while dividing the sequence. Meanwhile, when the position cut by the gesture operation is in a region outside the boundary of the scene image Np corresponding to the scene boundary in which the transition is set, the CPU 101 divides the sequence while leaving the setting of the transition as it is.

In addition, it is assumed that, with respect to the sequence image Kp corresponding to the sequence in which the BGM is set, a gesture operation for cutting the sequence image Kp with one finger perpendicularly to the time axis while pressing the sequence image Kp with another finger is performed.

Then, the CPU 101 divides the sequence in accordance with the gesture operation. At the same time, the CPU 101 leaves, as it is, the setting of the BGM with respect to sequences that are in the head side of the BGM from among the sequences newly set as a result of the division, and cancels the setting of the BGM with respect to the other sequences.

In addition, it is assumed that a gesture operation of cutting the sequence image Kp with one finger perpendicularly to the time axis while pressing the sequence image Kp with another finger is performed with respect to the sequence image Kp corresponding to the sequence in which the effect is set.

Then, when a position cut by the gesture operation is within the scene image Np of the scene in which the effect is set, the CPU 101 divides the scene, and sets the effect in each of the scenes newly set as a result of the division.

Meanwhile, when the position cut by the gesture operation is outside the scene image Np of the scene in which the effect is set, the CPU 101 divides the sequence while leaving the setting of the effect as it is.

In this manner, on the editing screen 200, when dividing the sequence in which the transition, the effect, or the BGM is set, the setting thereof may be changed, as necessary.

2-3. Operation Input Processing Procedure

Next, in the above described moving image editing application, an operation input processing procedure of a case in which a gesture operation is performed with respect to the sequence image Kp will be described using the flowchart shown in FIG. 17.

Figure 17:
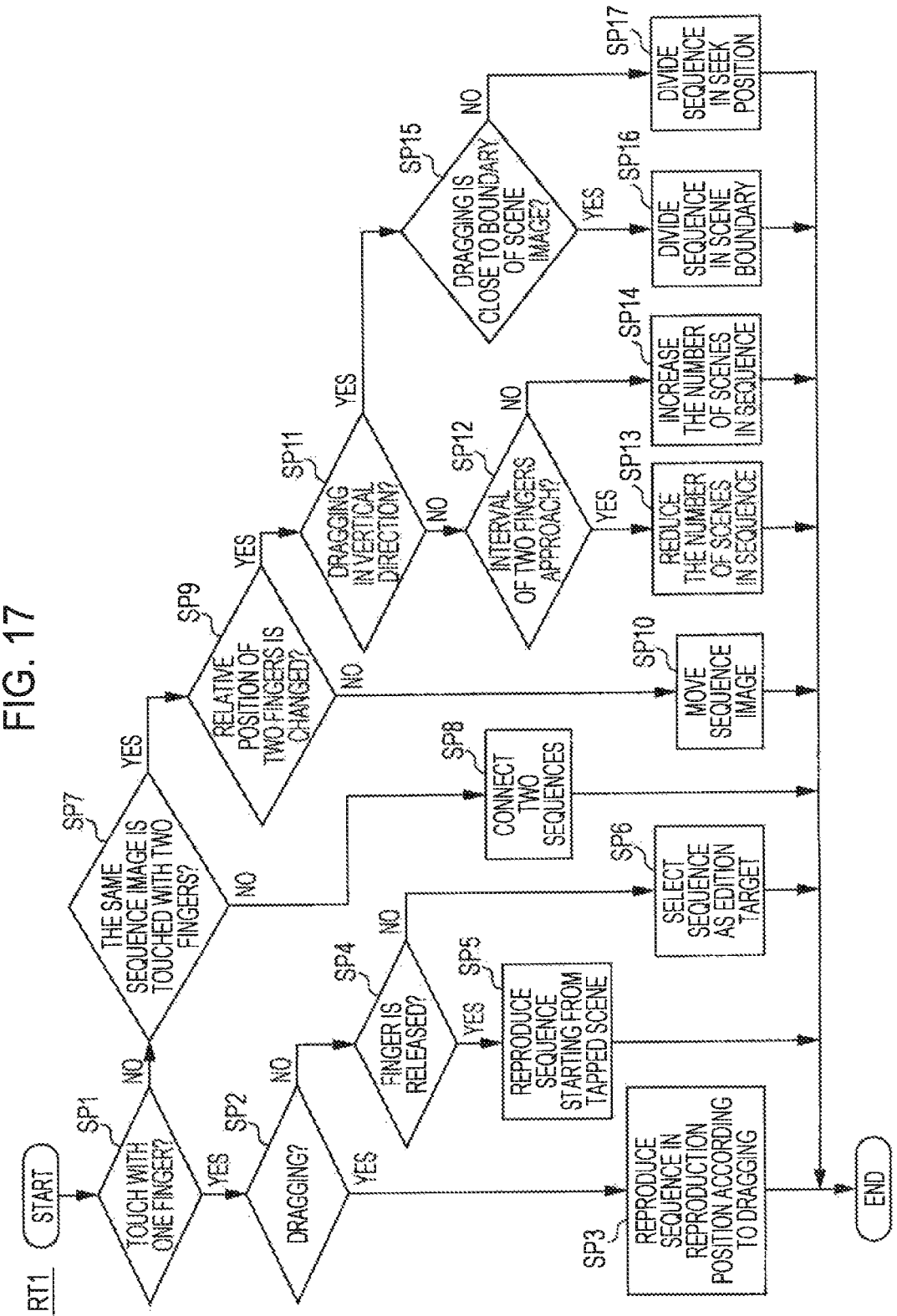
FIG. 17 is a flowchart showing an operation input processing procedure.

In addition, the operation input processing procedure RT1 shown in FIG. 17 is a procedure of a process that is performed by the CPU 101 of the information terminal 100 in accordance with a program of the moving image editing application stored in the nonvolatile memory 102.

The CPU 101 displays the sequence image Kp in accordance with a user's operation after initiation of the moving image editing application, and starts the operation input processing procedure RT1 when an arbitrary part within the sequence image Kp is touched to proceed to step SP1.

In step SP1, the CPU 101 determines whether only one finger touches on the touch panel 104B based on an input signal from the touch panel 104B.

When an affirmative result is obtained in step SP1, the CPU 101 proceeds to step SP2, and determines whether dragging is performed at that time.

When an affirmative result is obtained in step SP2, this means that an operation of dragging with one finger within the sequence image Kp is performed. In this instance, the CPU 101 proceeds to step SP3, reproduces the sequence while changing the reproduction position in accordance with the dragging, and terminates the operation input processing procedure RT1.

Meanwhile, when a negative result is obtained in step SP2, the CPU 101 proceeds to step SP4, and determines whether the touching finger is separated from the touch panel 104B within a predetermined time.

When an affirmative result is obtained in step SP4, this means that an operation of touching the sequence image Kp with one finger is performed. In this instance, the CPU 101 proceeds to step SP5, reproduces the sequence starting from the head of the scene corresponding to the touched scene image Np, and terminates the operation input processing procedure RT1.

Meanwhile, when a negative result is obtained in above described step SP4, this means that an operation of holding the sequence image Kp with one finger is performed. In this instance, the CPU 101 proceeds to step SP6.

In step SP6, the CPU 101 selects the sequence corresponding to the held sequence image Kp as the editing target, and terminates the operation input processing procedure RT1.

In addition, when a negative result is obtained in the above described step SP1, this means that an operation of touching the touch panel 104B with two fingers is performed. In this instance, the CPU 101 proceeds to step SP7.

In step SP7, the CPU 101 determines whether the two fingers touch within the same sequence image Kp.

When a negative result is obtained in step SP7, this means that an operation of dragging the sequence image Kp with one finger while holding the sequence image Kp with another finger is performed. In this instance, the CPU 101 proceeds to step SP8.

In step SP8, the CPU 101 adds a corresponding sequence to the held sequence image Kp, selects the sequence corresponding to the dragged sequence image Kp as the editing target, and moves a display position of the sequence image Kp in accordance with the dragging. Thereafter, when a distance between two sequence images Kp is a predetermined value or less, the CPU 101 connects the two sequences corresponding to the sequence images Kp to thereby terminate the operation input processing procedure RT1.

Meanwhile, when an affirmative result is obtained in the above described step SP7, the CPU 101 proceeds to step SP9, and determines whether a relative position of the touch position in the two fingers is changed.

When a negative result is obtained in step SP9, this means that an operation of dragging the sequence image Kp with two fingers is performed. In this instance, the CPU 101 proceeds to step SP10, and moves the display position of the sequence image Kp corresponding to the dragging to thereby terminate the operation input processing procedure RT1.

Meanwhile, when an affirmative result is obtained in step SP9, this means that an operation of dragging with one finger within the sequence image Kp while holding the sequence image Kp with another finger is performed. In this instance, the CPU 101 proceeds to step SP11.

In step SP11, the CPU 101 determines whether the corresponding dragging is dragging perpendicularly to the time axis of the sequence image Kp. In addition, in this instance, the CPU 101 determines whether dragging in the perpendicular direction is performed when a movement distance in a perpendicular direction of the touch position reaches a predetermined value or more. In addition, the direction perpendicular to the time axis of the sequence image Kp includes a direction considered as being almost perpendicular as well as only a strictly perpendicular direction. That is, when it is within a range considered as being almost perpendicular, the CPU 101 determines to be substantially perpendicular.

When a negative result is obtained in step SP11, this means that an operation of dragging the sequence image Kp with one finger in a direction (horizontal direction) parallel to the time axis while holding the sequence image Kp with another finger is performed. In this instance, the CPU 101 proceeds to step SP12, and determines whether an interval between the touch positions of the two fingers approaches each other.

When an affirmative result is obtained in step SP12, this means that an operation for narrowing an interval between the touching two fingers within the sequence image Kp is performed. In this instance, the CPU 101 proceeds to step SP13.

In step SP13, the CPU 101 reduces the number of scenes in accordance with the corresponding operation in the sequence corresponding to the sequence image Kp, and terminates the operation input processing procedure RT1.

Meanwhile, when a negative result is obtained in step SP12, this means that an operation for increasing the interval between the touching two fingers within the sequence image Kp is performed. In this instance, the CPU 101 proceeds to step SP14.

In step SP14, the CPU 101 increases the number of scenes in accordance with the corresponding operation in the sequence corresponding to the sequence image Kp, and terminates the operation input processing procedure RT1.

In addition, when an affirmative result is obtained in the above described step SP11, this means that an operation for dragging with one finger within the sequence image Kp in a direction perpendicular to the time axis while holding the sequence image Kp with another finger is performed. That is, the operation for dragging denotes a gesture operation for cutting the sequence image Kp with one finger perpendicularly to the time axis while pressing the sequence image Kp with another finger. In this instance, the CPU 101 proceeds to step SP15.

In step SP15, the CPU 101 determines whether a position in which the dragging is performed is closer to a boundary of two scene images Np from the boundary of the two scene images Np and a display position of the seek bar Bs.

When an affirmative result is obtained in step SP15, this means that a gesture operation for cutting the boundary of two scene images Np is performed. In this instance, the CPU 101 proceeds to step SP16. In step SP16, the CPU 101 divides the sequence at the boundary of two scenes corresponding to the two scene images Np, and terminates the operation input processing procedure RT1.

Meanwhile, when a negative result is obtained in step SP15, this means that a gesture operation for cutting a display position of the seek bar Bs is performed. In this instance, the CPU 101 proceeds to step SP17. In step SP17, the CPU 101 divides the sequence at a position (that is, seek position) on the time axis corresponding to the display position of the seek bar Bs, and terminates the operation input processing procedure RT1.

According to the above described operation input processing procedure RT1, the CPU 101 performs division, connection, and reproduction of the sequence in accordance with a gesture operation corresponding to the sequence image Kp.

2-4. Operation and Effect

As for the information terminal 100 in the above described configuration, the sequence (moving image data) is partitioned at an arbitrary time interval, and moving image data of each part of the partitioned sequence is handled as a scene. Next, the CPU 101 of the information terminal 100 displays the sequence image Kp obtained such that the scene images Np representing the contents of the respective scenes are aligned in an order corresponding to the time series of the respective scenes to be connected for each sequence.

Thus, the information terminal 100 allows the user to confirm the contents of the sequence (moving image data) along the time series.

Here, when a gesture operation for tracing the sequence image Kp with one finger along the time axis is performed, the CPU 101 reproduces the sequence at a position on the time axis corresponding to a position (that is, touch position) traced by the gesture operation.

Thus, the information terminal 100 allows the user to confirm a reproduction image of the sequence in a reproduction position desired by the user, by an intuitive operation.

In addition, the CPU 101 displays the seek bar Bs perpendicular to the time axis of the sequence image Kp on a position corresponding to the reproduction position of the sequence on the sequence image Kp, while reproducing the sequence.

In this state, when a gesture operation for tracing the seek bar Bs with one finger while pressing the sequence image Kp with another finger is performed, the CPU 101 divides the sequence in the reproduction position of the sequence.

Thus, the information terminal 100 divides the sequence by the intuitive operation while allowing the user to confirm the reproduction image of the sequence of the divided position.

In addition, when a gesture operation for cutting the sequence image Kp with one finger perpendicularly to the time axis at the boundary of the two scene images Np while pressing the sequence image Kp with another finger is performed, the CPU 101 divides the sequence at the position of the boundary of the two scenes corresponding to the two scene images Np.

Thus, the information terminal 100 divides the sequence by the intuitive operation while allowing the user to confirm the contents of a scene before and after a position divided by the scene image Np.

In the above described configuration, when a gesture operation for cutting an image (sequence image Kp) representing the contents of the moving image data along the time axis, perpendicularly to the time axis, the information terminal 100 divides moving image data at a position on the time axis corresponding to the position cut by the gesture operation.

Thus, the information terminal 100 cuts out a part desired by the user from the moving images by a more intuitive operation in comparison with the related art, thereby significantly improving the operability in comparison with the related art.

3. Another Embodiment

3-1. Another Embodiment 1

In addition, in the above described embodiment, editing (division, connection, reproduction, increasing in the number of scenes, and the like) is performed on the moving image data in accordance with the gesture operation corresponding to the image (sequence image Kp) representing the contents of the moving image data along the time axis.

Without being limited to this, in a case of temporally continuous data, a variety of data (for example, music, slide show of photographs, recorded voice, turn around period data of each work on a Gantt chart, or the like) other than the temporally continuous data may be edited in accordance with the gesture operation.

For example, in an application for editing the music, music data may be edited in accordance with a gesture operation corresponding to an image representing the contents of the music data along the time axis.

In this case, the CPU 101 displays an image showing a voice waveform of the music data on a screen for each packet of the music data, as the image representing the contents of the music data along the time axis.

Next, when a gesture operation for cutting the image perpendicularly to the time axis is performed, the CPU 101 divides the music data corresponding to the image at a position on the time axis corresponding to the position cut by the gesture operation.

In addition, when a gesture operation for dragging corresponding two images to make them approach each other is performed, the CPU 101 connects two packets of music data corresponding to the two images.

In addition, the music data is partitioned in a bit unit, and an image in which images showing each part of the partitioned music data are aligned in time series may be displayed as the image representing the contents of the music data along the time axis. In addition, the music data is partitioned in a unit such as melody A, melody B, the hook of a song, and the like, and the image in which the images showing each part of the partitioned music data are aligned in time series may be displayed as the image representing the contents of the music data along the time axis.

In addition, for example, in an application for creating a Gantt chart, the CPU 101 displays, on the screen, a crossbar having a length proportional to a turn around period of each work, resource, or the like for the purpose of representing the turn around period. Next, the CPU 101 may divide a turn around period of a work, resource, or the like corresponding to the crossbar in accordance with a gesture operation for cutting the crossbar perpendicularly to the time axis.

3-2. Another Embodiment 2

In addition, in the above described embodiment, the gesture operation for cutting the sequence image Kp with one finger perpendicularly to the time axis while pressing the sequence image Kp with another finger is received as the operation input for dividing the sequence.

Without being limited thereto, the CPU 101 may receive a gesture operation for only cutting the sequence image Kp with one finger perpendicularly to the time axis without performing the gesture operation for pressing the sequence image Kp as the operation input for dividing the sequence.

Specifically, the CPU 101 receives an operation for dragging the sequence image Kp with one finger perpendicularly to the time axis as the operation input for dividing the sequence. In addition, for example, the CPU 101 receives an operation for dragging the sequence image Kp with one finger in a direction parallel to the time axis as an operation input for seek-reproducing the sequence in the same manner as that in the above described embodiment.

In this case, the CPU 101 may determine whether the operation input for dividing the sequence or the operation input for seek-reproducing the sequence is performed depending on whether the operation for dragging the sequence image Kp with one finger is performed in a direction perpendicular to or parallel to the time axis.

In addition, by doing this, a user may drag the sequence image Kp with one finger in the direction parallel to the time axis, and only change the direction of the dragging as it is to the direction perpendicular to the time axis when fining a desired position by the seek-reproduction, so that it is possible to divide the sequence in a corresponding position.

That is, the user may readily switch the operation input for seek-reproducing the sequence into the operation input for dividing the sequence, so that it is possible to divide the sequence in the desired position found by the seek-reproduction.

In addition, without being limited thereto, when a gesture operation for cutting the sequence image Kp with one finger perpendicularly to the time axis is reciprocatively performed, the sequence may be divided at a position on the time axis corresponding to the position cut by the corresponding gesture operation.

In this case, the CPU 101 receives an operation for vertically and reciprocatively dragging the sequence image Kp with one finger as an operation input for dividing the sequence. Next, the CPU 101 divides the sequence in a scene boundary when the position in which the dragging is reciprocatively performed is in the scene boundary, and divides the sequence in a seek position when the position in which the dragging is reciprocatively performed is in a display position of the seek bar Bs.

By doing this, for example, even though a case in which the dragging is inadvertently performed in the direction perpendicular to the time axis while dragging the sequence image Kp in the direction parallel to the time axis by the user, the sequence is not instantaneously divided. That is, the information terminal 100 prevents the sequence from being inadvertently divided by the user.

In addition, without being limited thereto, in a case in which an operation for dragging the sequence image Kp with two fingers perpendicularly to the time axis is performed, the CPU 101 may divide the sequence in two places.

For example, with respect to the sequence image Kp of the sequence 1 having the scenes 1 to 5 shown in FIG. 7A, it is assumed that an operation for simultaneously tracing downward a boundary of the scene image Np of the scenes 2 and 3 and a boundary of the scene image Np of the scenes 4 to 5 is performed.

Then, the CPU 101 receives this operation as an operation input for dividing the sequence in two places. Next, the CPU 101 divides the sequence at the boundary between the scenes 2 and 3, and at the boundary between the scenes 4 and 5. As a result, the sequence 1 is divided into new three sequences such as a sequence having the scenes 1 and 2, a sequence having the scenes 3 and 4, and a sequence having the scene 5.

In addition, without being limited thereto, the CPU 101 may receive, as the operation input for dividing the sequence, an operation for dragging the sequence image Kp perpendicularly to the time axis using a position other than the sequence image Kp as a starting point while holding the sequence image Kp with one finger.

In this case, the CPU 101 receives, as an operation input for changing the number of scenes within the sequence, an operation for dragging the sequence image Kp in the direction parallel to the time axis using the position within the sequence image Kp as the starting point while holding the sequence image Kp with one finger.

By doing this, the CPU 101 determines whether the operation input for dividing the sequence or the operation input for changing the number of scenes is performed depending on whether the starting point of the dragging is outside the sequence image Kp, in addition to whether the dragging is performed in the direction perpendicular to or parallel to the time axis.

Accordingly, the CPU 101 may more accurately determine whether the operation input for dividing the sequence or the operation input for changing the number of scenes is performed.

3-3. Another Embodiment 3

In addition, in the above described embodiment, the operation for dragging the sequence image Kp with two fingers is received as an operation input for moving the display position of the sequence image Kp.

Without being limited thereto, the CPU 101 may receive an operation for dragging the sequence image Kp with one finger as an operation input for moving the display position of the sequence image Kp.

In addition, in this case, it is assumed that a separate operation as well as the operation for dragging the sequence image Kp with one finger in the direction parallel to the time axis are assigned to the operation input for seek-reproducing.

Even in this case, the CPU 101 receives the operation for dragging the sequence image Kp with one finger perpendicularly to the time axis while holding the sequence image Kp with another finger as the operation input for dividing the sequence as described above.

By doing this, the CPU 101 may determine whether the operation input for moving the display position of the sequence image Kp or the operation input for dividing the sequence is performed depending on whether the sequence image Kp is held with one finger.

3-4. Another Embodiment 4

In addition, in the above described embodiment, the CPU 101 partitions the moving image data for each predetermined time intervals when importing the moving image file to the moving image editing application, and sets each of the partitioned moving image data as a single scene.

Without being limited thereto, the information terminal 100 may set the scene in a variety of methods other than the above described method. For example, the CPU 101 may set a moving image from the photographing start to the photographing end as a single scene. In addition, for example, the CPU 101 may perform a predetermined scene detection process for detecting a related single scene on the story as a scene, and set the detected scene as a scene used in the moving image editing application. In addition, as the scene detection process, a well-known scene detection process such as a process performed such that a feature quantity of each frame is extracted, a point of time when the screen changes significantly is detected based on the difference of the feature quantity between frames, and the point of time is detected as a boundary of the scenes may be used.

3-5. Another Embodiment 5

In addition, in the above described embodiment, the CPU 101 disposes the sequence image Kp in the arbitrary position in accordance with the user's operation on the editing screen 200.

Without being limited thereto, the CPU 101 may display, on the editing screen 200, a plurality of sequence images Kp in a row in order (that is, in order which is finally produced as a movie) of coupling the sequences.

In this case, a transition may be set for the joining of the adjacent coupled sequences.

Figure 18A:
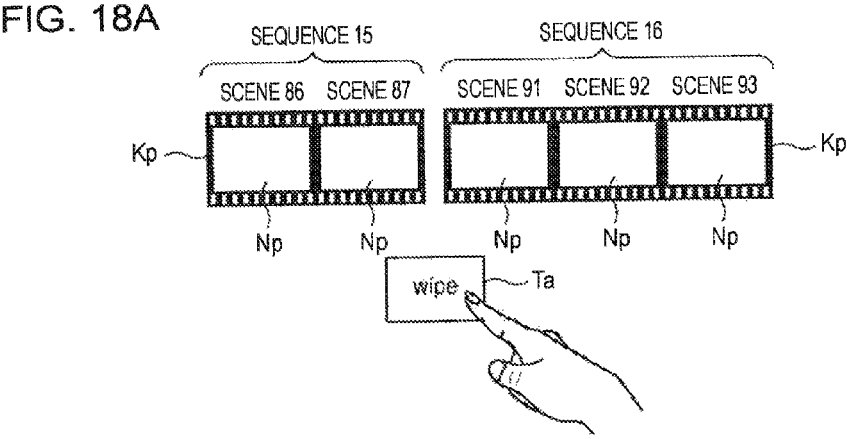
FIGS. 18A and 18B are is an outlined line drawing accompanying an explanation of setting of a transition according to another embodiment of the present disclosure.

For example, as shown in FIG. 18A, it is assumed that a sequence image Kp of a sequence 15 having scenes 86 and 87 and a sequence image Kp of a sequence 16 having scenes 91 to 93 are displayed adjacent to each other on the editing screen 200. Here, when finally produced as the movie, the sequence 15 and the sequence 16 are coupled.

Here, it is assumed that a transition icon Ta is dragged with one finger to approach a space between the sequence image Kp of the sequence 15 and the sequence image Kp of the sequence 16, and the distance of the transition icon Ta and the space is a predetermined value or less.

Figure 18B:
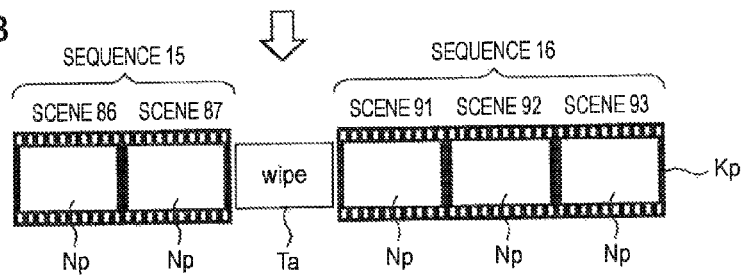

Then, the CPU 101 sets a transition (here, wipe) corresponding to the transition icon Ta in the joining of the sequence 15 and the sequence 16. At the same time, as shown in FIG. 18B, the CPU 101 inserts the transition icon Ta into the space between the sequence image Kp of the sequence 15 and the sequence image Kp of the sequence 16.

3-6. Another Embodiment 6

In addition, in the above described embodiment, the CPU 101 sets the transition in the joint of scenes in the sequence in accordance with the user's operation.

Without being limited thereto, the CPU 101 may insert, in the joint of scenes, a variety of data (for example, a still image, a separate sequence, or the like) other than this as data connecting two scenes.

In this case, similar to the described above, the CPU 101 displays an icon or the like representing the data connecting the two scenes, so that, when the corresponding icon is dragged to approach a boundary of the scene image Np, and a distance between the icon and the boundary is a predetermined value or less, the corresponding data is inserted in the joint of the scenes.

3-7. Another Embodiment 7

In addition, in the above described embodiment, the moving image is handled using a unit such as a scene or a sequence, and the image (sequence image Kp) in which images (scene images Np) of head frames of the respective scenes are connected and aligned in order of time series is displayed as the image representing the contents of the sequence along the time axis.

Without being limited thereto, the CPU 101 may display a variety of images other than a corresponding image as long as the corresponding image is an image representing the contents of the moving image data along the time axis. The CPU 101 may extract a thumbnail image of a frame from the moving image data for each predetermined time interval to produce an image in which the extracted thumbnail images are connected and aligned in order of time series, and display the produced image.

3-8. Another Embodiment 8

In addition, in the above described embodiment, the operation for dragging the sequence image Kp with one finger in the direction parallel to the time axis while holding the sequence image Kp with another finger is received as the operation input for changing the number of scenes in the sequence.

Without being limited thereto, an operation of dragging both the sequence images Kp with two fingers, and widening or narrowing an interval between the two fingers may be received as the operation input for changing the number of scenes in the sequence.

In addition, in the above described embodiment, an operation for dragging the sequence image Kp with one finger while holding the sequence image Kp with another finger to shorten a distance thereof may be received as the operation input for coupling the sequences.

Without being limited thereto, an operation for dragging the sequence images Kp different from each other with two fingers to shorten the distance thereof may be received as the operation input for coupling the sequences.

3-9. Another Embodiment 9

In addition, in the above described embodiment, when the gesture operation for cutting the sequence image Kp perpendicularly to the time axis is performed, the CPU 101 divides the sequence in the two scene boundary or in the seek position in accordance with the position cut by the gesture operation.

Without being limited thereto, in a case in which the gesture operation for cutting the sequence image Kp perpendicularly to the time axis, the CPU 101 may divide the sequence in a variety of positions as long as the position is the position on the time axis corresponding to the position cut by the gesture operation.

For example, when the gesture operation for cutting the sequence image Kp perpendicularly to the time axis, the CPU 101 may divide the sequence at a position on the time axis corresponding to the position cut by the gesture operation without limiting to the scene boundary or the seek position.

In addition, for example, when the gesture operation for cutting the sequence image Kp perpendicularly to the time axis, the CPU 101 may divide the sequence at the boundary of a scene corresponding to the boundary of the scene image Np closest to the position cut by the gesture operation, regardless of whether the seek bar Ba is displayed.

3-10. Another Embodiment 10

In addition, in the above described embodiment, when the gesture operation for tracing the sequence image Kp along the time axis is performed, the CPU 101 reproduces the sequence, and at the same time, displays the seek bar Bs in the position corresponding to the reproduction position on the sequence image Kp.

Without being limited thereto, when reproducing the sequence, the CPU 101 may typically display the seek bar Bs in the position corresponding to the reproduction position on the sequence image Kp. For example, even when reproducing the sequence starting from the scene corresponding to the trapped scene image Np, the CPU 101 may display the seek bar Bs in the position corresponding to the reproduction position on the sequence image Kp.

3-11. Another Embodiment 11

In addition, in the above described embodiment, a transition is set in accordance with the operation for dragging the transition icon Ta to approach the boundary of the scene image Np within the sequence image Kp.

Without being limited thereto, the transition may be set in accordance with the operation for making the transition icon Ta approach the boundary of the scene image Np within the held sequence image Kp with one finger while holding the sequence image Kp with another finger.

In this case, the CPU 101 selects the sequence corresponding to the held sequence image Kp as the editing target. Next, when the transition icon Ta approaches, by a predetermined distance or more, the boundary of the scene image Np within the sequence image Kp corresponding to the sequence selected as the editing target, the CPU 101 sets the transition in the corresponding sequence. That is, in this instance, the CPU 101 sets the transition in only the sequence selected as the editing target. Accordingly, even though the transition icon Ta approaches a boundary of a scene image Np within a sequence image Kp corresponding to a sequence other than the sequence selected as the editing target, the CPU 101 does not set the transition.

In addition, even with respect to the BGM icon Ba or the effect icon Ea, the BGM or the effect may be set in the same manner.

3-12. Another Embodiment 12

In addition, in the above described embodiment, in the information terminal 100 as the information processing apparatus, the touch screen 104 acting as the operation unit and the display unit, and the CPU 101 acting as the control unit are set.

The present disclosure is not limited thereto, and the respective functional units (the operation unit, the display unit, and the control unit) of the above described information terminal 100 may be configured by different types of hardware as long as the different types of hardware have the same function.

In addition, for example, in the information terminal 100, a liquid crystal display having the touch panel function may be provided instead of the touch screen 104 including the liquid crystal panel 104A and the touch panel 104B. In addition, in a case in which an operation input is performed only with one finger in the same manner as that in another embodiment 2, a touch panel (that is, touch panel of a single touch scheme) which does not support multi-touch may be provided. In addition, instead of the liquid crystal panel 104A, an organic EL (Electro Luminescence) display may be provided.

In addition, without being limited to the touch panel, the present disclosure may be applied to an information processing apparatus having a variety of operation devices other than this, and may be applicable.

Specifically, the present disclosure may be applied to an information processing apparatus having operation devices in which gesture operations are performed on the screen such as a mouse, a touch pad with buttons, a joystick with buttons, an analog stick with which insertion operation is performed, a camera, and the like.

Practically, in a case of performing the gesture operation using the mouse, the CPU 101 displays a pointer moved in accordance with a movement of the mouse on the screen. Thereafter, a user moves the pointer to a desired position to click on a button of the mouse, thereby starting the gesture operation on the screen. Next, the user moves the mouse to move the pointer as leaving the button clicked, thereby performing the gesture operation on the screen.

In addition, for example, in a case of dragging using a touch pad with buttons, the CPU 101 displays, on the screen, the pointer moved in accordance with a touch operation for the touch pad. Thereafter, the user moves the pointer to a desired position, and presses a button of the touch pad, thereby starting the gesture operation on the screen. Next, the user moves the touch position to move the pointer as leaving the button pressed, thereby performing the gesture operation on the screen.

In addition, in a case of dragging using the joystick, the CPU 101 displays the pointer moved in accordance with an inclination of the joystick on the screen. Thereafter, the user moves the pointer to a desired position to press buttons of the joystick, thereby starting the gesture operation on the screen. Next, the user inclines the joystick to move the pointer as leaving the button pressed, thereby performing the gesture operation on the screen.

In addition, in a case of dragging using the analog stick, the CPU 101 displays, on the screen, a pointer moved in accordance with an inclination of the analog stick. Thereafter, a user moves this pointer to a desired position to insert the analog stick, thereby starting the gesture operation on the screen. Next, the user inclines the analog stick as leaving the analog stick inserted, and moves the pointer, thereby performing the gesture operation on the screen.

In addition, in a case of dragging using the camera, the CPU 101 recognizes a movement of a finger based on an image photographed by the camera, and displays, on the screen, a pointer moved in accordance with the movement of the finger. Thereafter, a user moves the pointer to a desired position, and performs a desired gesture (for example, a gesture of drawing a circle with finger), thereby starting the gesture operation on the screen. Next, the user further moves the finger to move the pointer, thereby performing the gesture operation on the screen.

Incidentally, the above described operation is merely an example, and an operation (that is, gesture operation on the screen) for drawing a predetermined trajectory on the screen may be performed.

In addition, as long as the information processing apparatus of the present disclosure is an information processing apparatus having the above described operation devices other than the touch screen 104, an operation device and a display device may be separately provided, and the information processing apparatus may be connected to an external display device.

In addition, in the above described embodiment, the present disclosure is applied to the information terminal 100. Without being limited thereto, as long as the information processing apparatus of the present disclosure is a device handling the moving image data, the present disclosure may be applied to a digital still camera, a personal computer, a television receiver, a hard disk recorder, a portable phone, and the like, and also applied to a variety of devices other than these.

3-13. Another Embodiment 13

In addition, in the above described embodiment, a program for performing a variety of processings is written in the nonvolatile memory 102 of the information terminal 100.

Without being limited thereto, for example, a slot of a storage medium such as a memory card, and the like is provided in the information terminal 100, so that the CPU 101 may read and perform the program from the storage medium plugged into the slot. In addition, the CPU 101 may install the program read from the storage medium in the nonvolatile memory 102. In addition, the CPU 101 may download the program from a device on the network through a network interface 106, and install the downloaded program in the nonvolatile memory 102.

3-14. Another Embodiment 14

In addition, the present disclosure is not limited to the above described embodiments and other embodiments. That is, an application range of the present disclosure covers even an embodiment in which a part or the whole of the above described embodiments and the other embodiments is arbitrarily combined, or an embodiment in which a part thereof is extracted.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    circuitry configured to
        acquire a result of detection of a gesture operation; and
        control display, on a display unit, of a data image representing contents of temporally continuous data along a time axis,
    wherein when the gesture operation is performed upon the data image for changing a distance along the time axis, the circuitry initiates a changing of a number of displayed partial data items of the data, with an animation, by changing a time interval of the temporally continuous data based on an amount of the gesture operation,
    wherein the animation first depicts a stretching of scene images of the data image and then creation of an additional scene image to appear between the stretched images.

2. The information processing apparatus according to claim 1, wherein a width of the data image is changed with the animation.

3. The information processing apparatus according to claim 1, wherein when the amount of the gesture operation reaches two widths of a scene image, a total number of scene images of the data image is increased by two.

4. The information processing apparatus according to claim 3, wherein the total number of scene images of the data image is increased by two by way of displaying a stretching animation of stretching the data image to increase the number of scene images.

5. The information processing apparatus according to claim 3, wherein when the amount of the gesture operation reaches three widths of the scene image, the total number of scene images of the data image is increased by three.

6. The information processing apparatus according to claim 1, wherein when the amount of the gesture operation reaches three widths of a scene image, a total number of scene images of the data image is increased by three.

7. The information processing apparatus according to claim 1, wherein, when the gesture operation is performed upon the data image for extending the data image along the time axis, the circuitry initiates an increasing of the number of the displayed partial data items of the data by reducing the time interval into which the temporally continuous data is partitioned.

8. The information processing apparatus according to claim 7, wherein widths of the displayed partial data items are animated to stretch by equal magnitude in accordance with the gesture operation.

9. The information processing apparatus according to claim 1, wherein, when the gesture operation is performed upon the data image for contracting the data image along the time axis, the circuitry initiates a reduction of the number of the displayed partial data items in the data by increasing the time interval into which the temporally continuous data is partitioned.

10. The information processing apparatus according to claim 9, wherein widths of the displayed partial data items are animated to be reduced based on a magnitude of the gesture operation.

11. The information processing apparatus according to claim 1, wherein the circuitry is further configured to set a piece of music associated with a sequence of the partial data items.

12. The information processing apparatus according to claim 11, wherein the circuitry is further configured to initiate a reproduction of the piece of music in association with a head of the sequence of the partial data items.

13. The information processing apparatus according to claim 1, wherein the circuitry is further configured to initiate display of a cover image of a piece of music in accordance with a user operation.

14. The information processing apparatus according to claim 13, wherein the circuitry is further configured to animate the cover image to be adhered to a lower side of a sequence of the partial data items, and change the cover image icon to a background music icon.

15. The information processing apparatus according to claim 14, wherein a width of the cover image icon corresponds to a length of the sequence of the partial data items.

16. The information processing apparatus according to claim 1, wherein the data image is partitioned at arbitrary time intervals.

17. An information processing apparatus comprising:
    circuitry configured to
        acquire a result of detection of a gesture operation; and
        control display, on a display unit, of a data image representing contents of temporally continuous data along a time axis,
    wherein when the gesture operation is performed upon the data image for changing a distance along the time axis, the circuitry initiates a changing of a number of displayed partial data items of the data, with an animation, by changing a time interval of the temporally continuous data based on an amount of the gesture operation,
    wherein the animation first depicts a shortening animation of shortening the data image and then deletion of an scene image between the shortened images.

18. An information processing method comprising:
acquiring a result of detection of a gesture operation; and
displaying a data image representing contents of temporally continuous data along a time axis,
wherein when the gesture operation is performed upon the data image for changing a distance along the time axis, a number of displayed partial data items of the data is changed with an animation, by changing a time interval of the temporally continuous data based on an amount of the gesture operation,
wherein the animation first depicts a stretching of scene images of the data image and then creation of an additional scene image to appear between the stretched images.

19. A non-transitory computer-readable medium having embodied thereon a program, which when executed by a computer causes the computer to perform a method, the method comprising:
acquiring a result of detection of a gesture operation; and
displaying a data image representing contents of temporally continuous data along a time axis,
wherein when the gesture operation is performed upon the data image for changing a distance along the time axis, a number of displayed partial data items of the data is changed with an animation, by changing a time interval of the temporally continuous data based on an amount of the gesture operation,
wherein the animation first depicts a stretching of scene images of the data image and then creation of an additional scene image to appear between the stretched images.

* * * * *